United States Patent [19]

Hanke

[11] 4,422,147
[45] Dec. 20, 1983

[54] WIND SHEAR RESPONSIVE TURBULENCE COMPENSATED AIRCRAFT THROTTLE CONTROL SYSTEM

[75] Inventor: Charles R. Hanke, Bellevue, Wash.

[73] Assignee: The Boeing Company, Seattle, Wash.

[21] Appl. No.: 185,299

[22] Filed: Sep. 8, 1980

[51] Int. Cl.³ .............................................. G05D 1/08
[52] U.S. Cl. .................. 364/440; 340/27 SS; 244/182
[58] Field of Search ............... 364/424, 433, 440, 442; 244/181, 182, 188, 191; 73/178 R, 178 T; 340/27 NA, 27 SS

[56] References Cited

U.S. PATENT DOCUMENTS

| | | | |
|---|---|---|---|
| 2,948,496 | 8/1960 | Joline | 244/182 |
| 3,448,948 | 6/1969 | Reevink | 244/182 |
| 3,840,200 | 10/1974 | Lambregts | 340/27 SS |
| 3,892,374 | 7/1975 | Lambregts | 244/182 |
| 3,901,466 | 8/1975 | Lambregts | 244/180 |
| 3,955,071 | 5/1976 | Lambregts | 73/178 R |
| 3,989,208 | 11/1976 | Lambregts | 244/182 |
| 4,012,713 | 3/1977 | Greene et al. | 340/27 R |
| 4,106,731 | 8/1978 | Bliss | 244/188 |
| 4,133,503 | 1/1979 | Bliss | 244/188 |
| 4,189,118 | 2/1980 | Peter-Contesse et al. | 340/27 SS |
| 4,189,119 | 2/1980 | Peter-Contesse et al. | 244/182 |
| 4,209,152 | 6/1980 | Stephan | 364/442 |
| 4,212,444 | 7/1980 | Stephan | 364/433 |
| 4,245,805 | 1/1981 | Stephan | 244/188 |

*Primary Examiner*—Gary Chin
*Attorney, Agent, or Firm*—Christensen, O'Connor, Johnson & Kindness

[57] ABSTRACT

A turbulence compensated aircraft throttle control system is augmented with switching logic and signal processing to subtantially decrease the magnitude of wind shear-induced airspeed errors and the time required to recover from such airspeed errors. The disclosed arrangements include a throttle controller having a speed control channel that is responsive to airspeed error and a turbulence compensation channel that is responsive to aircraft airspeed and longitudinal inertial acceleration of the aircraft. A signal representative of the wind shear being encountered by the aircraft is derived within the turbulence compensation channel (or from signals provided thereby) and is processed to form a wind shear compensation signal that is coupled into the speed command channel whenever the airspeed error exceeds a predetermined amount. The wind shear compensation signal supplements the airspeed error signal to substantially increase the magnitude of the throttle command signal. In the more detailed disclosed arrangements signal coupling between the speed command channel and the turbulence compensation channel aids in controlling system response to changes in selected airspeed and, during an encounter with wind shear, also couples the wind shear compensation signal back into the turbulence compensation channel to cause even further corrective throttle action.

20 Claims, 9 Drawing Figures

WIND SHEAR RESPONSIVE TURBULENCE COMPENSATED AIRCRAFT THROTTLE CONTROL SYSTEM

BACKGROUND OF THE INVENTION

This invention relates to flight control systems of the type wherein the amount of fuel supplied to an aircraft propulsion unit is controlled to maintain the aircraft at or near a desired (i.e., selected) airspeed. More specifically, this invention relates to aircraft automatic throttle control systems and methods for achieving improved operation when the aircraft is subjected to atmospheric disturbances, including those disturbances commonly denoted as turbulence and wind shear.

It is well-known in the art that an automatic throttle control system, the aircraft employing the system, the aircraft propulsion system and the throttle mechanism for controlling the propulsion system collectively form a closed-loop control system that is subject to a number of somewhat contradictory design objectives and constraints. The primary system objective is that aircraft airspeed must be maintained above a minimum value (based on aircraft stall speed and a suitable safety margin) under all possible flight conditions and regardless of all other performance requirements. A second objective that is often of significant importance is system accuracy, i.e., the system's ability to maintain a constant selected airspeed within a predetermined tolerance. This aspect of system performance also affects or even determines the minimum airspeed obtainable with a particular system in that the difference between the minimum airspeed that can be maintained by the system and aircraft stall speed (the safety margin) must be equal to or greater than the system accuracy (airspeed tolerance).

To achieve a high degree of system accuracy, especially in the presence of rather abrupt changes in airspeed, the throttle control system response must be both very rapid and very precise. In fact, because the aircraft and its propulsion system exhibit a relatively long response time (i.e., a substantial amount of time is required for a change in throttle setting to result in the associated change in thrust and airspeed), optimum performance in response to rather abrupt changes in airspeed generally requires that the portion of the system which detects changes in airspeed and generates the throttle command signal present as little additional time delay as possible. In terms of frequency response, this means that the portion of the system that generates the throttle command signal (referred to hereinafter as the throttle controller) exhibit a relatively high cutoff frequency.

Accurate and precise systematic operation not only requires rapid throttle action but also requires adequate system damping in order to ensure that a change in selected airspeed or a change in propulsive thrust results in smoothly varying throttle control that does not overshoot or hunt about the proper thrust setting. Considered in terms of the throttle controller's frequency response, adequate damping of the overall system generally requires a relatively low cutoff frequency (i.e., a long response time) which, to a certain degree, conflicts with the requirement for a high cutoff frequency (fast response time) that is generally imposed by the previously discussed considerations pertaining to system accuracy.

Structuring a throttle control system to provide rapid response to undesired changes in airspeed while simultaneously obtaining the desired or necessary system damping is further complicated by the fact that a change or perturbation in airspeed error can be induced by atmospheric conditions as well as by an intended change in the selected airspeed by changes in thrust and drag that result from operation of the various aircraft flight control systems. In this regard, even if the system throttle controller exhibits an extremely short response time, the previously mentioned relatively long response time of the aircraft and its propulsion system will not allow a significant change in airspeed within the time period associated with relatively short term (high frequency) atmospheric disturbance such as those presented during periods of atmospheric turbulence. Thus, unless such a system includes means for compensating for turbulence-induced airspeed errors, a substantial amount of ineffectual throttle activity can be experienced whenever the aircraft encounters turbulent conditions. Such throttle activity not only causes annoying variations in engine noise, but also increases fuel consumption and exerts unnecessary stress and wear on the aircraft propulsion system.

Although compensation for turbulence-induced airspeed errors can be at least conceivably obtained by further control of the throttle controller damping factor or perhaps by configuring the system so that the generated throttle command signal is independent of all atmospherically-induced speed variations, such techniques do not result in totally satisfactory operation. In particular, to maintain satisfactory accuracy under all flight conditions, the system must also respond to atmospherically induced airspeed errors of a longer duration (lower frequency) than those associated with atmospheric turbulence. For example, when an aircraft navigates within a region of wind shear and changes altitude, a rather substantial airspeed error can develop if the system is not sensitive to atmospherically-induced speed variations at those frequencies associated with the wind shear.

Various automatic throttle control arrangements have been proposed in an attempt to overcome the above-mentioned constraints or at least reduce the compromises in system operation that result therefrom to the lowest possible level. In this regard, the approach commonly taken is the use of a multichannel (multiloop) throttle control system that utilizes both airspeed error and one or more signals based on the inertial acceleration of the aircraft as the system control parameters. More specifically, such a throttle control system can be represented by a system model (e.g., a basic block diagram) that is mathematically characterized by the control law: $\delta_t K_a V_e + K_b V$, where $\delta_t$ is the throttle command signal, $K_a$ and $K_b$ are gain factors that may be constants or functions of frequency and other system parameters, $V_e$ denotes the current value of airspeed error and $V$ is representative of the current value of inertial acceleration along the longitudinal axis of the aircraft (i.e., instantaneous inertial acceleration along the flight path).

As is evidenced by the arrangements described in U.S. Pat. No. 2,948,496 to Joline; U.S. Pat. No. 3,448,948 to Reerink; and U.S. Pat. Nos. 3,840,200, 3,892,374, and 3,955,071 to Lambregts, utilization of longitudinal inertial acceleration as a control parameter can be advantageous both from the standpoint of system damping requirements and from the standpoint of compensating the system for atmospheric turbulence to thereby at least partially eliminate undue throttle activity. In this regard, and with respect to overall system operation, the use of inertial acceleration to improve system damping characteristics corresponds to rate feedback in that airspeed is the controlled quantity and inertial acceleration (which is proportional to the derivative of the controlled quantity with respect to time) is utilized as a control parameter that alters the magnitude of the throttle control signal. Thus, when the system is causing the aircraft to accelerate toward a selected airspeed, the inertial acceleration term decreases the magnitude of the system action substantially in accordance with the rate at which airspeed error is decreasing. For example, if a system is configured such that a "speed high" condition produces a positive throttle component $K_a V_e$ and if the gain factor $K_b$ is positive, deceleration of the aircraft will result in a decrease in throttle command signal, $\delta_t$, as the aircraft responds to the speed high condition and decelerates. As is known in the art, this means that $K_a$ and $K_b$ can be selected so that an abrupt, undesired change in airspeed initially results in a rapid corrective change in airspeed with the throttle command signal decreasing thereafter as a result of both the diminished airspeed error and the corrective acceleration term. Thus, when properly configured, a system utilizing both airspeed error and inertial acceleration as control parameters will rapidly return to the selected airspeed or capture a newly selected airspeed with minimal overshoot and unnecessary throttle activity.

The use of inertial acceleration to provide turbulence compensation is based on a somewhat more subtle relationship between aircraft airspeed and inertial acceleration than the relationship which results in the above-discussed "inertial speed damping". In particular, an atmospherically-induced change in airspeed is accompanied by inertial acceleration that is opposite in polarity (sign) relative to inertial acceleration associated with a similar or identical airspeed disturbance that is induced by either a change in aircraft propulsive force or selected airspeed. For example, if aircraft thrust decreases, both airspeed and ground speed decrease and, utilizing normal signal convention, inertial acceleration is negative (deceleration of the aircraft). On the other hand, if airspeed decreases due to a reduction in head wind (or an increase in tail wind), and compensatory throttle action is not initiated, ground speed normally increases (due to reduced drag) and the associated inertial acceleration is positive. Corresponding acceleration relationships exist relative to increases in airspeed that are induced by atmospheric conditions and by either changes in propulsive force or selected airspeed, with each of the above-mentioned patents to Joline, Reerink and Lambregts utilizing such relationship to provide turbulence compensation within an automatic throttle control system. For example, the system disclosed in the patent to Joline includes a first control loop (channel) wherein a signal that is representative of airspeed error is low-pass filtered to substantially eliminate all airspeed deviations attributable to atmospheric disturbances, including both turbulence and wind shear. This channel, which is identified as the "airspeed loop", establishes the behavior of the system relative to low frequency disturbances and a second control loop or channel is configured to control the high frequency response of the system. In this respect, the second control loop is responsive to a signal representative of the longitudinal inertial acceleration and includes a low-pass filter network having a lower cutoff frequency than the filter network utilized in the airspeed loop. By judiciously selecting filter cutoff frequencies, at least a certain degree of turbulence compensation can be achieved.

The patent of Reerink discloses two multichannel arrangements for producing a turbulence compensated throttle command signal based on airspeed error and inertial accleration signals that are each characterized by the previously mentioned control law. In the arrangements disclosed by Reerink, various signal components proportional to the time rate of change in airspeed error and inertial acceleration are superimposed (algebraically combined) so that speed errors induced by atmospheric disturbances produce minimal control action.

Although the systems disclosed by the patents to Joline and Reerink may provide adequate turbulence compensation in the least demanding situations, neither of these arrangements include means for providing satisfactory operation when an airspeed error is induced by low frequency atmospheric disturbances such as wind shear. For example, the arrangments disclosed by Reerink do not appear to include any means capable of, in effect, distinguishing between wind shear and turbulence-induced airspeed disturbances. Further, maintaining a satisfactory degree of responsiveness to wind shear by controlling the cutoff frequencies and even the order of the filter functions employed in the type of arrangement disclosed in the patent to Joline would not appear practical, at least in those systems that impose relatively stringent performance requirements. For example, an attempt to increase the order of the filter functions would introduce additional signal delay that would further increase system response time and would also substantially increase the complexity of the system.

The automatic throttle control systems disclosed in the above mentioned patents to Lambregts are characterized by the previously mentioned control law wherein both airspeed error and inertial acceleration are utilized as control parameters with the disclosed arrangements providing a certain degree of responsiveness to wind shear-induced airspeed errors. More specifically, the arrangements disclosed by Lambregts include a "wind shear detector" which, in effect, determines the difference between the current value of inertial acceleration and derived acceleration (time rate of change in airspeed error) and sequentially processes a signal representative of this difference with first order low-pass filter and first order rate limited filtering. The resulting signal, which is indicative of that part of the airspeed error that is caused by wind shear, is then combined with signals proportional to the total airspeed error and inertial acceleration in a manner which provides a measure of corrective throttle action during encounters with wind shear while simultaneously eliminating ineffectual and unnecessary turbulence-induced throttle activity.

Although the arrangement and technique disclosed in the patents to Lambregt may be satisfactory with many types of aircraft and under a variety of operating conditions, further improvement in wind shear response is desirable, or in some situations, necessary. For example, extremely demanding requirements can be imposed in an automatic throttle control system that is operational during landing approach wherein approach is to be made at minimum airspeed to thereby minimize landing distance. The prior art automatic throttle control systems have not been entirely satisfactory in such situations, especially relative to approaches under conditions of decreasing wind shear that cause a decrease in airspeed. For example, even the most accurate prior art turbulence compensated automatic throttle control systems exhibit an airspeed loss of as much as approximately 4 knots when executing landings under conditions of moderate, decreasing wind shear. In addition, in one such system an attendant loss of approximately one degree in flight path angle was experienced (due to an increase in angle of attack of approximately the same magnitude). Further, although a prior art system may be capable of restoring the aircraft to the selected airspeed, an extremely long recovery time can be required. For example, with respect to a system that was utilized prior to the development of the hereinafter described invention, a period of approximately 28 seconds is required for the system to return the aircraft to the selected approach speed.

Since relevant state of the art systems can maintain airspeed within approximately ±1 knot, under all normally encountered conditions other than wind shear, the airspeed loss and recovery time experienced with prior art systems substantially detracts from overall system performance capabilities and the general desirability of the system. Additionally, although such prior art wind shear response requirements can be accommodated within the system safety margins and thus not present unnecessary risk to the aircraft, a pilot (or other responsible member of the flight crew) will often disengage an automatic throttle control system during such a speed loss and assume manual throttle control in order to absolutely ensure that airspeed will not drop below the value necessary to maintain lift. It will be recognized that even occasional lack of confidence and unnecessary return to manual throttle control at least partially defeats the purpose of an automatic throttle control system and that a low confidence level often means that the flight crew will simply not utilize a particular system unless they have no other choice.

Accordingly, it is an object of this invention to provide an aircraft speed controller wherein turbulence-induced excess throttle activity is minimized.

It is another object of this invention to provide an aircraft automatic throttle control system that accurately maintains a selected airspeed when the aircraft is subjected to environmental disturbances while also eliminating ineffectual throttle activity due to relatively high frequency components of such disturbances, including those generally identified as turbulence.

It is yet another object of this invention to provide a turbulence compensated automatic throttle control system which remains responsive to wind shear induced airspeed changes without significantly increasing the system delay time and thereby detracting from system performance while operating under normal atmospheric conditions.

It is still another object of this invention to provide a turbulence compensated wind shear responsive throttle control system suitable for use during landing and approach maneuvers.

SUMMARY OF THE INVENTION

These and other objects are achieved in accordance with this invention by arranging an automatic throttle control system so that the system is characterized by the previously-mentioned control law $K_aV_e + K_bV$, whenever airspeed error, $V_e$, is less than a predetermined value and so that the magnitude of $V_e$ (and/or the inertial acceleration term V) is at least temporarily altered by an amount proportional to the present value of atmospheric wind shear whenever airspeed error exceeds this predetermined value. Thus, in accordance with the present invention throttle control action increases whenever the airspeed error exceeds the selected predetermined limit and at least a portion of such error is caused by wind shear. Stated otherwise and in accordance with conventional control system modeling techniques, the type of system embraced by the invention includes a throttle controller having first and second signal paths or channels wherein the first signal channel is responsive to airspeed error and exhibits a transfer characteristic $K_a$ and the second signal channel is responsive to the longitudinal inertial acceleration of the aircraft and exhibits a transfer characteristic $K_b$. For convenience, the first and second signal paths are hereinafter referred to as the speed command channel and the turbulence compensation channel, respectively. Based on such a characterization of the system, the invention operates to introduce an additional wind shear representative signal into the speed command channel and/or the turbulence compensation channel whenever airspeed error exceeds a predetermined threshold value.

In each arrangement of the invention, airspeed error detection and associated switching logic are utilized to couple a signal representative of the current value of wind shear into the speed command channel whenever the airspeed error exceeds a preselected value that is preferably equal to or somewhat less than system airspeed accuracy under all operating conditions other than wind shear. This wind shear representative signal is derived from the current values of $V_e$ and V, and in the preferred embodiments of the invention is made available within the turbulence compensation channel without requiring additional circuitry or signal processing. Regardless of the exact arrangement utilized in deriving the wind shear representative signal, the signal is combined with the signal flowing through the speed command channel to increase the throttle command signal and, hence, cause throttle action and a change in aircraft airspeed that rapidly reduce the airspeed error. Further, in one disclosed embodiment of the invention, an additional signal path is provided to couple a portion of the signal flowing through the speed command channel into the turbulence compensation channel to thereby increase the turbulence compensation component of the throttle command signal ($K_bV$) and provide extremely rapid response to a detected wind shear condition.

In one disclosed embodiment, the system is arranged to couple the wind shear representative signal into the speed command channel only during periods in which the wind shear tends to decrease aircraft airspeed, e.g., an encounter with decreasing head wind shear while executing a landing approach. In this particular system, the turbulence compensation channel is a wind shear detector similar to that disclosed in the previously referenced patents to Lambregts and supplies a wind shear representative signal by, in effect, implementing the steps of: (1) differentiating the aircraft's true airspeed with respect to time to determine a "derived" or "computed" value of acceleration; (2) determining the difference between the derived acceleration and the current value of longitudinal inertial acceleration; and, (3) processing of the difference signal with a first order (low pass) filter and a first order rate-limited filter. The filtered or processed wind shear representative signal is then subtracted from the current value of longitudinal inertial acceleration and scaled (e.g., amplified) by a constant (corresponding to $K_b$ in the previously mentioned control law) to provide the turbulence compensation portion of the throttle command signal.

In this same embodiment of the invention, a signal representative of the selected airspeed is supplied to the speed command channel and limited to ensure that airspeeds outside of a range that is appropriate to the aircraft and throttle control system of interest will not result in throttle action. The limited signal is then processed by a network having a first order filter response (low pass filtered) to establish system response relative to changes in selected airspeed and eliminate any relatively high frequency noise signals that may be present. The filtered speed command signal is then subtracted from the calibrated airspeed, which is supplied by a conventional air data system such as a flight control computer, to produce the airspeed error signal, $V_e$. The airspeed error signal is then scaled (e.g., amplified) to provide the previously discussed $K_aV_e$ component of the throttle command signal.

The wind shear correction unit of the embodiment being discussed includes a limiter network or signal processing which eliminates all wind shear representative signals except those associated with decreases in airspeed (e.g., decreasing head wind shear). In addition, this embodiment of the invention includes signal processing means for maintaining the wind shear representative signal proportional to the magnitude of wind shear present as long as aircraft speed is more than a predetermined threshold value below the selected value and for causing the compensation signal to decay exponentially as soon as aircraft airspeed is within the predetermined threshold value. Further, this particular embodiment of the invention includes an additional signal path that couples a signal proportional to the time rate of change in the above-mentioned speed command signal from the speed command channel to the turbulence compensation channel to provide additional control system response during abrupt changes in selected airspeed. In the preferred embodiment, this signal path originates upstream of the speed command channel first order filter and interconnects with the turbulence compensation channel at the output of the wind shear detector to thereby couple the wind shear correction signal back into the turbulence compensation channel and further increase corrective throttle action during aircraft encounters with wind shear.

As is the case with a large number of state-of-the-art flight control systems, including many prior art throttle control systems, the present invention can be realized in both analog and digital embodiments. In this regard, the preferred embodiments for use with relatively large modern aircraft are usually digital arrangements of a type implemented by conventional logic circuitry, including signal processing arrangements having computational capability. For example, the present invention may be embodied to operate through the use of discrete logic circuits and computational logic circuits such as those included in an arrangement commonly called a microprocessor. In some situations, wherein the aircraft of interest employs one or more computer-based flight control systems, at least the majority of the signal processing required in the practice of the present invention can be implemented within that computer. Accordingly, a computer-based realization of the above-discussed embodiment of the invention is described herein, including a signal flow diagram which can be utilized to program a system employing a general purpose computer or to establish the required firmware (i.e., arrangement and interconnection) of a microprocessor implemented embodiment.

BRIEF DESCRIPTION OF THE DRAWINGS

Other objects and advantages of the present invention will become apparent to one skilled in the art after reading the following description taken together with the accompanying drawings in which.

DETAILED DESCRIPTION OF THE INVENTION

Figure 1:
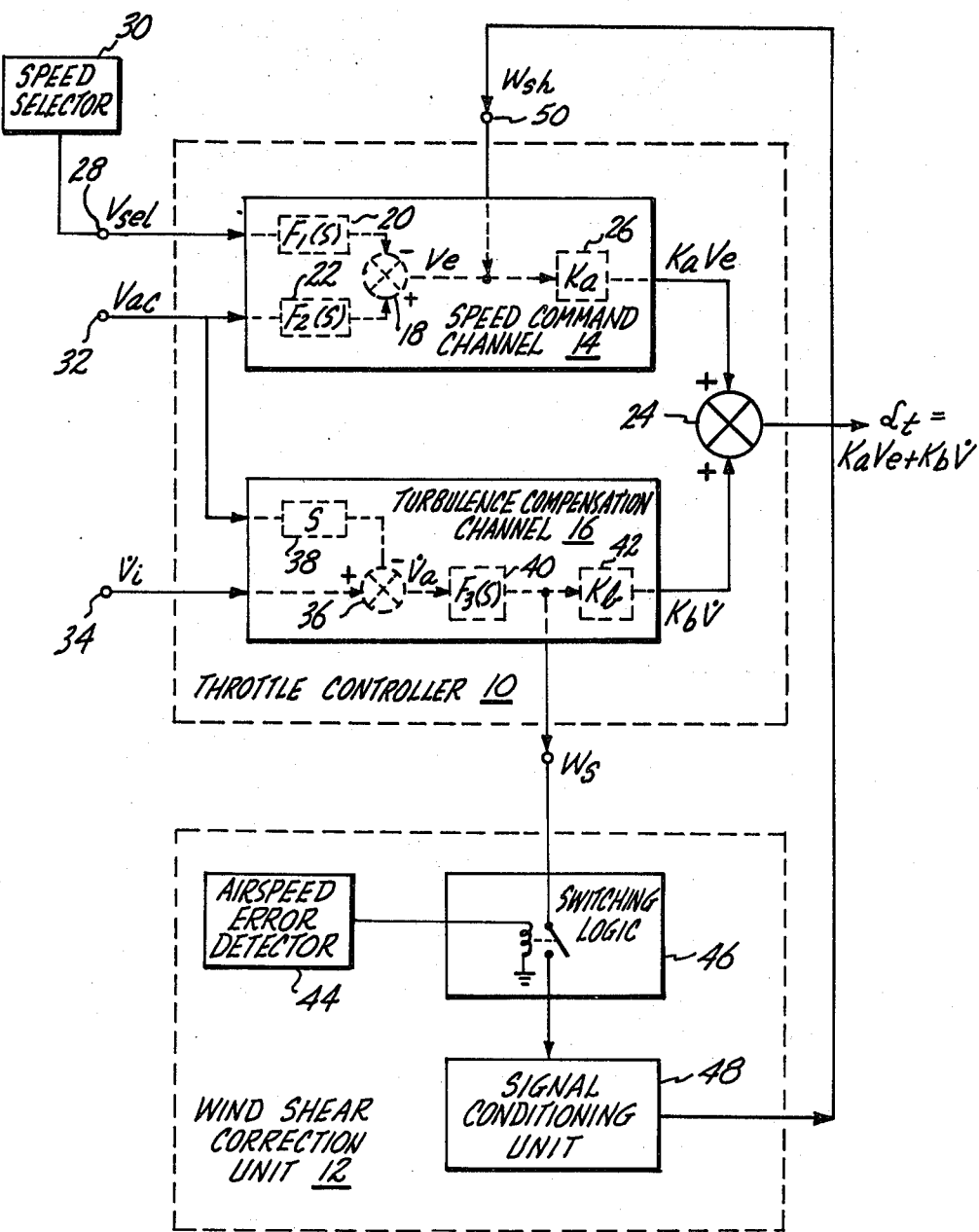
FIG. 1 is a block diagram illustrating the basic arrangement and signal processing of an automatic throttle control system constructed in accordance with this invention.

As is diagramatically indicatd in FIG. 1, an automatic throttle control system constructed in accordance with this invention basically includes a throttle controller 10, which is arranged to provide turbulence-compensated throttle control, and a wind shear correction unit 12 for providing additional throttle control whenever the system airspeed error exceeds a selected value and such error is caused entirely or partially by wind shear. As is indicated in FIG. 1, airspeed controller 10 is characterized by a throttle command signal or control law $\delta_t = K_aV_e + K_b\dot{V}$, where $V_e$ denotes airspeed error, $\dot{V}$ is based on inertial longitudinal acceleration (i.e., acceleration along the flight path) and $K_a$ and $K_b$ are gain factors.

Those skilled in the art will recognize that various conventional automatic throttle control systems can be characterized by the above-mentioned control law, including the arrangements in the previously referenced patents to Joline, Reerink, and Lambregts. Thus, it will be recognized that airspeed controller 10 of FIG. 1 is a system (or signal processing) model that generically represents a variety of turbulence-compensated automatic throttle control systems which can advantageously employ the present invention. For example, as illustrated by hereinafter discussed embodiments of the invention, variations in the control law that significantly improve one or more characteristics of such a system are possible since gain factors $K_a$ and $K_b$ (as well as other relevant transfer characteristics within the system) can be constants or can be functions of one or more parameters such as the frequency of the system disturbance. Further, additional parametric factors can be included within the system and hence the control law, if desired or necessary.

Referring more specifically to the arrangement of FIG. 1, the illustrate model of throttle controller 10 includes two signal paths or channels denoted as speed command channel 14 and turbulence compensation channel 16, with speed command channel 14 providing the signal processing necessary to produce the signal component $K_a V_e$ of the above-mentioned throttle command signal and turbulence compensation channel 16 providing the signal processing required to produce the signal component $K_b \dot{V}$. More specifically, speed command channel 14 includes signal processing means for combining a signal $V_{sel}$ that represents the selected or desired aircraft airspeed with a signal $V_{ac}$ that represents current airspeed to thereby obtain the airspeed error signal $V_e$. For example, in the depicted arrangement, $V_{sel}$ and $V_{ac}$ are respectively coupled to the input ports of a conventional summing device 18 via signal processing units 20 and 22. Since summing device 18 is configured to provide the difference between the applied signals, $V_e$ is equal to $V_{ac}F_2(s) - V_{sel}F_1(s)$, where $F_1(s)$ and $F_2(s)$ are the frequency domain transfer functions of signal processing units 22 and 20, respectively. As is schematically indicated in FIG. 1, the signal supplied by the summing device 18 is coupled to one input port of a second summing device 24 via a signal processing unit or path 26, having the previously mentioned gain factor $K_a$.

Those skilled in the art will recognize that various conventional arrangements can be utilized in implementing signal processing units 20, 22, and 26 and summing units 18 and 24, with the structure and techniques employed depending on the nature of the signals involved (e.g., analog or digital) and other factors relevant to each particular application of the invention. Further, it will be recognized that the signal $V_{sel}$ can be supplied to the terminal 28 and hence to signal conditioning unit 20 by conventional apparatus such as an airspeed selector 30 that is diagramatically depicted in FIG. 1. Similarly, a signal $V_{ac}$ that represents current airspeed can be supplied to a terminal 32 of speed command channel 12 and thus to signal conditioning unit 22 by various conventional speed sensing devices or, alternatively, by one of the various air data systems that compute or derive an indication of airspeed, including those commonly identified as calibrated airspeed and true airspeed.

Turbulence compensation channel 16 of FIG. 1 includes means for combining the airspeed signal $V_{ac}$ with a signal $\dot{V}_i$, which is representative of the longitudinal inertial acceleration of the aircraft, to produce a signal $\dot{V}_a$, which is indicative of airspeed disturbances that are induced by atmospheric conditions, including turbulence and wind shear. Apparatus for supplying the longitudinal acceleration signal $\dot{V}_i$ to a terminal 34 of turbulence compensation channel 16 is known in the art, including arrangements discussed in the previously mentioned patents to Lambregts and U.S. Pat. No. 4,012,713, to Green et al., wherein the longitudinal acceleration signal is derived by combining the signals supplied by a conventional accelerometer and a pitch attitude gyro. As is schematically represented in FIG. 1, detection of atmospherically induced airspeed errors (generation of the signal $\dot{V}_a$) basically comprises determining the difference between the inertial longitudinal acceleration of the aircraft and a "computed" or "derived" value of acceleration that is based on the airspeed signal $V_{ac}$. In this regard, FIG. 1 illustrates a block diagram arrangement for deriving a signal $\dot{V}_a$ that is representative of atmospherically induced airspeed errors wherein the airspeed signal $V_{ac}$ is coupled to one input port of a summing unit (subtracter) 36 via a differentiation network 38. The longitudinal inertial acceleration signal $\dot{V}_i$ is coupled to the second input port of the summing unit 36 so that the signal $\dot{V}_a$ is equal to $\dot{V}_i - sV_{ac}$, where s denotes the Laplacian operator.

Since atmospherically induced changes in airspeed exhibit acceleration of opposite polarity or sign than similar airspeed perturbations that are induced by changes in propulsive thrust (including those due to the operation of drag control devices such as flaps or other control surfaces), properly controlling inherent time delays within the differentiating network 38 and summing unit 36 will result in a signal $\dot{V}_a$ that is primarily representative of atmospherically induced changes in airspeed. In particular, when the aircraft experiences a decrease (increase) in airspeed caused by a change in net propulsive thrust, there is a corresponding decrease (increase) in longitudinal inertial acceleration. Thus, with reference to the notation utilized in FIG. 1, the signals $sV_{ac}$ and $\dot{V}_i$ are of the same algebraic sign (polarity) and tend to cancel one another within the subtractor 36 to thereby produce a signal $\dot{V}_a$ of minimal value whenever the airspeed of the aircraft employing the system changes due to changes in engine thrust and/or operation of one or more control surfaces. On the other hand, if the aircraft experiences atmospheric disturbance of a magnitude and duration sufficient to cause a change in airspeed, a decrease in airspeed is accompanied by positive longitudinal inertial acceleration and an increase in airspeed is accompanied by a negative inertial acceleration (deceleration). For example, when an aircraft encounters decreasing head winds (hence experiencing a decrease in airspeed), drag decreases and ground speed increases (positive inertial acceleration). Thus, since the derivative term, $sV_{ac}$ in the arrangement of FIG. 1 is negative while the longitudinal acceleration term $\dot{V}_i$ is positive, the subtractor 36 supplies a signal $\dot{V}_a$ that is positive and of a rather substantial magnitude. Since the opposite sign relationship occurs during atmospherically-induced increases in airspeed ($\dot{V}_i$ negative and $sV_{ac}$ positive), it can be recognized that $\dot{V}_a$ will vary in substantially direct relationship to the portion of any change in airspeed that is attributable to atmospheric disturbances of any type, including pure turbulence, wind shear, or combinations thereof.

To, in effect, separate the wind shear-induced signal component of $\dot{V}_a$ from those signal components induced by turbulence and the small amount of signal that can be present which is not induced by atmospheric conditions, $\dot{V}_a$ is processed by apparatus such as a filter 40 of FIG. 1, which exhibits a frequency domain transfer function denoted as $F_3(s)$. In this regard, since pure atmospheric disturbance consists of relatively short-term (high frequency) variations in wind force and airspeed, whereas normal aircraft maneuvers in wind shear cause changes in airspeed and inertial acceleration at substantially lower rates (frequencies), use of a filter function $F_3(s)$ which defines a high pass function will result in a signal $\dot{V} = \dot{V}_a F_3(s)$ that is representative of the turbulence component within the atmospherically induced airspeed changes. On the other hand, if $F_3(s)$ is a low pass function, the signal $V$ is primarily representative of wind shear induced changes in airspeed. To complete the turbulence compensation channel 16 and hence throttle controller 10, the output of the signal processing unit 40 is interconnected to the second input port of the summing device 24 by a gain unit 42. Since gain unit 42, which may be any appropriate means for amplifying or scaling the value of $\dot{V}$ exhibits a gain factor $K_b$, it can be recognized that summing unit 24 supplies the previously mentioned throttle control signal $\delta_t = K_a V_e + K_b \dot{V}$.

It should be recognized that the use of a signal $\dot{V}$ representative of wind shear or a signal $\dot{V}$ representative of turbulence (and hence the nature of the filter function $F_3(s)$ depends on the overall configuration of the throttle control system. For example, high pass filtering can be employed in turbulence compensation channel 16 and the turbulence representative signal $(K_b \dot{V})$ subtracted from the speed command signal within summing unit 24 to supply a throttle command signal with little or no turbulence-induced component. On the other hand, low pass filtering is utilized in turbulence compensation channel 16 of a throttle controller 10 that operates in a manner similar to that disclosed in the previously referenced patents to Joline and Lambregts.

Regardless of the exact arrangement utilized in implementing throttle controller 10, the transfer characteristics of the signal processing blocks within both speed command channel 14 and turbulence compensation channel 16 (i.e., $K_a$, $K_b$, $F_1(s)$, $F_2(s)$, and $F_3(s)$ in FIG. 1) are primarily selected to attain satisfactory system performance when the aircraft is not subjected to atmospheric disturbances and, insofar as possible, to present an acceptable compromise relative to reducing turbulence-induced throttle activity while maintaining at least some degree of system performance when the aircraft encounters wind shear. To provide substantially improved wind shear performance relative to that attainable by arranging the throttle controller 10 in such a manner, wind shear correction unit 12 of the present invention is configured to inject a signal that is proportional to wind shear into speed command channel 14 whenever the difference between the current and selected values of airspeed exceeds a predetermined value or threshold. This signal, identified as $W_{sh}$ in FIG. 1, supplements the airspeed error signal $V_e$ within speed command channel 14 and thereby substantially increases the corrective nature of the resulting throttle command signal, $\delta_t$.

More specifically, in the arrangement of FIG. 1, wind shear correction unit 12 includes an airspeed error detector 44, which is connected to energize switching logic 46 whenever the difference between the actual and selected airspeed reaches or approaches a predetermined value (e.g., the minimum airspeed error attainable under relatively calm atmospheric conditions). As is indicated in FIG. 1, switching logic 46 is interconnected and arranged to couple a wind shear representative signal $W_s$ that is obtained from turbulence compensation channel 16 to the input port of a signal conditioning unit 48. Signal conditioning unit 48 further processes or conditions the wind shear representative signal $W_s$ and supplies the wind shear correction signal $W_{sh}$ to a terminal 50 of speed command channel 14 to thereby couple the wind shear correction signal into speed command channel 14.

Both airspeed error detector 44 and switching logic 46 can be realized by readily available circuitry or design techniques. For example, depending on the overall system configuration and requirements, airspeed error detector 44 can be a conventional comparator circuit that is responsive to the system airspeed error signal $V_e$; an arrangement of logic circuits which supply a logic gating signal whenever the specified signal conditions are present; or any other arrangement which, in effect, tests the current value of airspeed error against a selected predetermined limit. In a like manner, depending on the overall system arrangement, switching logic 46 (diagrammatically illustrated in FIG. 1 as a simple relay) can be a conventional transistor switching circuit, a logic gate, or any other similar arrangement that can be selectively enabled and disabled by the control signal supplied by airspeed error detector 44.

In accordance with the invention, the exact configuration of signal conditioning unit 48 depends on the arrangement of the remaining portions of the system and also depends on the throttle response characteristics of the aircraft which employs the invention. In this regard, and in view of the previously described operation of turbulence compensation channel 16, it can be recognized that the wind shear representative signal $W_s$ can be suitably filtered within signal conditioning unit 48 whenever required or necessary in order to further attenuate signal components that are not attributable to wind shear. In some situations, wherein a suitable signal is available within turbulence compensation channel 16, signal conditioning unit 48 can be eliminated or, simply comprise an amplifier or other means for scaling $W_s$. Alternatively, as is described in more detail relative to the arrangement of FIG. 2, signal conditioning unit 48 can include means for limiting the amplitude of the signal $W_s$ and/or means for causing the amplitude compensation signal $W_{sh}$ to decay as a function of time once the wind shear signal $W_{sh}$ has caused the aircraft to return to a speed that is within a predetermined value of the selected speed, $V_{sel}$.

Regardless of the detailed implementation of airspeed error detector 44, switching logic 46, and signal conditioning unit 48, the arrangement depicted in FIG. 1 operates to supply the wind shear representative signal $W_{sh}$ to speed command channel 14 of throttle controller 10 whenever the magnitude of the airspeed error is greater than the desired threshold level and removes the wind shear representative signal as soon as the system operates to reduce the airspeed error below this threshold level. As can be recognized from FIG. 1, the system control law will thus differ during periods in which the airspeed error is below and above the preselected airspeed error tolerance. In this regard, if the portion of speed command channel 14 which couples the wind shear signal $W_{sh}$ to wind shear correction unit 12 exhibits a transfer characteristic $F_4(s)$, speed command channel 14 will supply the previously mentioned throttle command signal component $K_a V_e$ whenever the airspeed error is less than the predetermined threshold level and will supply a throttle command signal component $K_a V_e + W_{sh} F_4(s) F_5(s)$ whenever the airspeed error exceeds such a predetermined threshold value, where $F_5(s)$ is the transfer function of signal conditioning unit 48. As shall be described relative to FIG. 2, in embodiments of throttle controller 10 wherein an additional signal path couples an intermediate signal node of speed command channel 14 to turbulence compensation channel 16, a signal component proportional to $W_{sh}$ is coupled into the turbulence compensation channel 16 to thereby modify the throttle command signal component $K_b \dot{V}$ and induce additional corrective throttle action.

In addition to the above-noted operational aspects of the arrangement of FIG. 1, it should be noted that the depicted switching logic 46 is activated solely on the basis of the value of airspeed error and hence, will be actuated whenever the system error exceeds the predetermined threshold, regardless of the type of disturbance that caused the error. For example, in many embodiments of the invention an abrupt aircraft maneuver or change in selected airspeed can cause the airspeed error to temporarily exceed the error level at which switching logic 46 activates. However, as previously described, turbulence compensation channel 16 and wind shear correction unit 12 are collectively arranged such that the signal $W_{sh}$ includes little or no signal components that are not representative of wind shear. Thus, even though disturbances other than wind shear can occasionally activate switching logic 46, a signal $W_{sh}$ that significantly alters the signal produced by speed command channel 14 (or turbulence compensation channel 16) is not supplied unless at least a portion of the disturbance (airspeed error) is induced by wind shear or some other low frequency change in atmospheric conditions.

Figure 2:
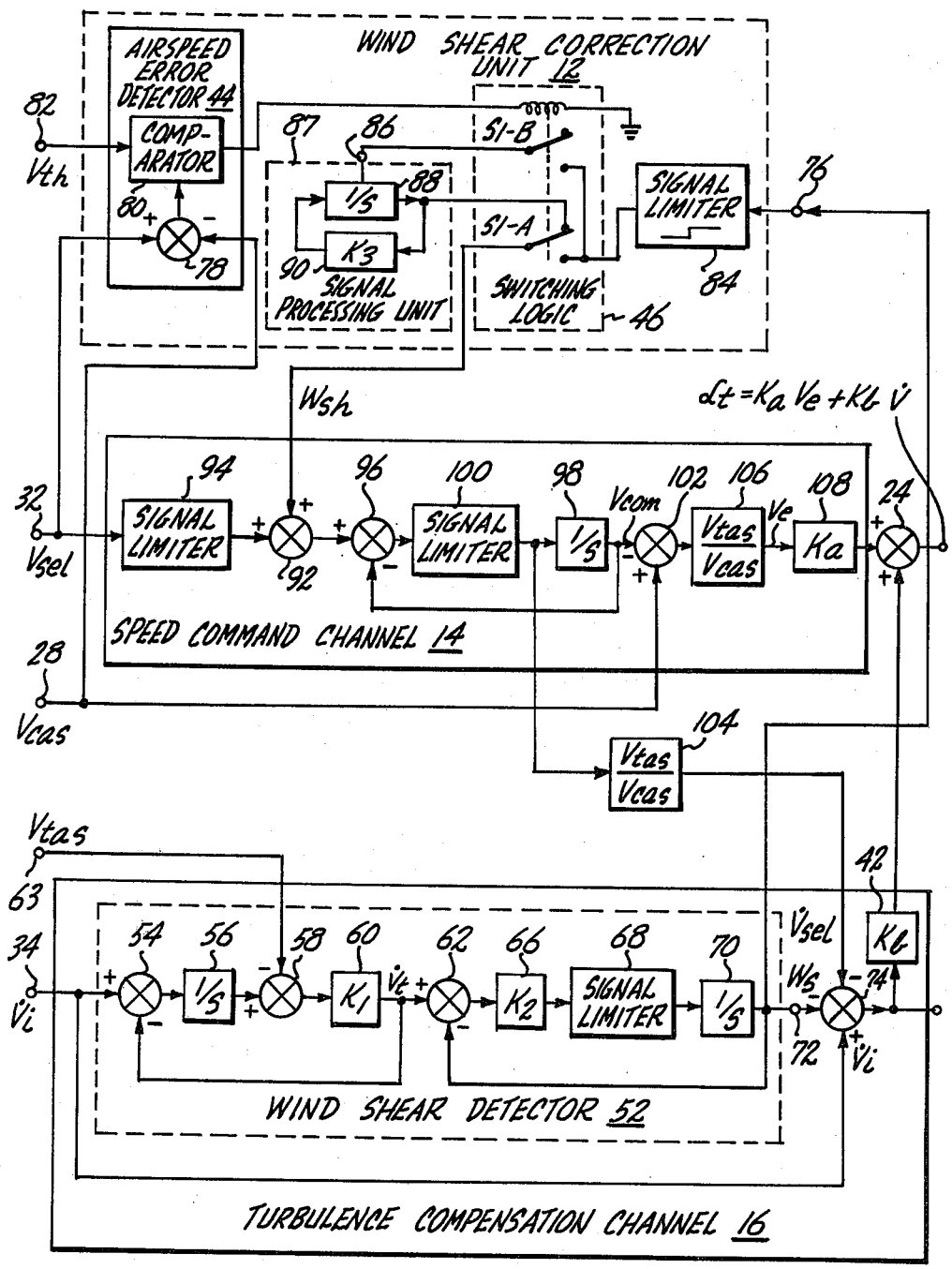
FIG. 2 is a block diagram illustrating a more detailed embodiment of the invention.

With reference being taken to FIG. 2, in one exemplary embodiment of the invention the turbulence compensation channel 16 includes a wind shear detector 52 which supplies the wind shear representative signal ($W_s$) to wind shear correction unit 12 and performs signal processing operations generally described with respect to differentiating unit 38, summing unit 36, and signal processing unit 40 of FIG. 1. More specifically, in the arrangement of FIG. 2, the longitudinal inertial acceleration signal ($\dot{V}_i$) is supplied to a summing unit 54 having the output port thereof connected to an integrator network 56. The output of integrator 56 is connected to the additive input port of a second summing unit 58. A gain unit 60 (e.g., a conventional amplifier or other signal processing arrangement) is connected between the output port of the summing unit 58 and the additive input port of a third summing unit 62 with the signal provided by gain unit 60 also being fed back to the subtractive input port of summing unit 54. To complete this portion of the wind shear detector 52, a signal $V_{tas}$, representative of the true airspeed of the aircraft is supplied to a terminal 63 and coupled to the subtractive input port of summing unit 58.

In view of the above-described portion of wind shear detector 52, those skilled in the art will recognize that the signal supplied by gain unit 60 can be expressed as $\dot{V}_t = K_1(\dot{V}_i - sV_{tas})/(s+K_1)$ where s is the Laplacian operator and $K_1$ is the gain factor associated with gain unit 60. Since $sV_{tas}$ is representative of the derivative of true airspeed with respect to time, it can be recognized that summing units 54 and 58, integrator 56 and gain unit 60 in effect collectively form signal processing means for determining the difference between the longitudinal inertial acceleration of the aircraft ($\dot{V}_i$) and a derived or computed acceleration ($sV_{tas}$) and for processing that difference signal with a first order filter function having a pole at $s = K_1$ and a zero at $s = 0$ (i.e., a first order low-pass function).

Recalling the previously discussed operation of wind shear detectors such as those disclosed in the previously referenced patents to Lambregts, it can thus be recognized that the signal $\dot{V}_t$ supplied to the additive input port of summing unit 62, is proportional to atmospherically-induced changes in the true airspeed of the aircraft and, because of the above-mentioned low-pass filtering, is primarily representative of low frequency components thereof such as wind shear.

To further attenuate signal components that are induced by turbulence or short-term disturbances rather than by wind shear, the signal $\dot{V}_t$ is processed with a rate-limited, first order filter function. This signal processing is represented in wind shear detector 52 of FIG. 2 in conventional block diagram form, wherein a gain unit 66, having a gain factor $K_2$, a conventional signal limiting network 68, and an integrator 70 are cascade connected between the output port of summing unit 62 and the wind shear detector output terminal 72, with the output of integrator 70 being fed back to the subtractive input port of summing unit 62.

The wind shear representative signal $W_s$, which is supplied to the terminal 72 by wind shear detector 52 by integrator 70, is coupled to a subtractive input port of a summing unit 74 and also to an input terminal 76 of wind shear correction unit 12. Since an additive input port of summing unit 74 is connected for receiving the inertial acceleration signal $\dot{V}_i$ and a second subtractive input port thereof receives a signal $\dot{V}_{sel}$, it can be recognized that summing unit 74 supplies a signal $\dot{V} = \dot{V}_i - W_s - \dot{V}_{sel}$, where, as shall be described in more detail, $\dot{V}_{sel}$ is supplied by the speed command channel and is representative of the time rate of change in the airspeed command signal. As was described relative to the embodiment of FIG. 1, a gain unit 42, having a gain factor of $K_b$ couples the throttle command signal component supplied by the turbulence compensation channel 16 to the summing unit 24.

In view of the above-described arrangement of wind shear detector 52 of FIG. 2, it can be recognized that the limiting levels of signal limiter 68 and the gain constants of gain units 60 and 66 ($K_1$ and $K_2$) can be selected so that the wind shear representative signal $W_s$ contains few signal components representative of system disturbances resulting from turbulence or intended changes in aircraft thrust and drag configuration. Thus, assuming that the signal $\dot{V}_{sel}$ is substantially 0 (i.e., the selected airspeed is not being changed), subtraction of the wind shear representative signal ($W_s$) from the longitudinal inertial acceleration signal ($\dot{V}_i$) produces a signal $\dot{V}$ having little or no wind shear component. However, the inertial acceleration signal $\dot{V}_i$ contains signal components representative of airspeed errors that are induced by atmospheric turbulence as well as airspeed errors caused by changes in propulsive thrust, signal components representing all types of airspeed errors except those induced by wind shear are contained in the signal $\dot{V}$. Thus, when $\dot{V}$ is multiplied by the gain factor $K_b$ and combined with the throttle command signal ($K_a V_e$) that is provided by the speed command channel 12, those components of the signal $K_a V_e$ that are representative of turbulence are, in effect, cancelled by turbulence-induced components in the signal $K_b \dot{V}$ whereas signal components induced by changes in propulsive thrust (including aircraft drag configuration) or a change in selective airspeed combine in an additive sense to produce a substantial throttle command signal ($\delta_t$). Further, since the wind shear representative components have, in effect, been removed from the signal $K_b \dot{V}$ in the above-discussed manner that portion of the signal $K_a V_e$ that represents wind shear will not be substantially affected by the turbulence compensation signal $K_b \dot{V}$. Thus, the system arrangement of FIG. 2 will attempt to maintain airspeed during wind shear encounters.

As will be discussed further, the signal $\dot{V}_{sel}$, which is indicative of the time rate of change in airspeed command, including changes in selected airspeed, further modifies the throttle command signal $\delta_t$ in a manner which improves the system operation whenever a new airspeed is selected. For example, as shall be discussed relative to the depicted arrangement of speed command channel 14, an increase in selected airspeed causes the $K_a V_e$ component of the throttle command signal $\delta_t$ to be negative and causes the $\dot{V}_{sel}$ signal to be positive. Because of the sign inversion (subtraction) within summing unit 74, a positive $\dot{V}_{sel}$ causes in a decrease in the level of the $K_b \dot{V}$ component of the throttle control signal $\delta_t$ and hence results in a more negative throttle command signal than would otherwise result. Accordingly, the throttles are advanced more rapidly and through a greater throttle angle than could be achieved without the $\dot{V}_{sel}$ signal. Since $K_a V_e$ is positive and $\dot{V}_{sel}$ is negative when the selected airspeed is decreased, the magnitude of the throttle command signal and corrective action temporarily increases during periods of time in which the selected airspeed is being altered or reset to reduce the throttle setting rapidly and significantly.

Referring now to wind shear correction unit 12 of the embodiment of FIG. 2, the depicted airspeed error detector 44 includes a summing unit 78 having an additive input terminal thereof connected to terminal 32 for receiving a signal representative of the selected airspeed, $V_{sel}$. A subtractive input terminal of summing unit 78 is connected to terminal 28 for receiving a signal representative of the calibrated airspeed of the aircraft, $V_{cas}$ and the output port of summing unit 78 is connected for supplying a signal representative of the aircraft error speed ($V_{sel} - V_{cas}$) to a first input terminal of a signal comparator 80. The output terminal of comparator 80 is connected for actuating switching logic 46 and the second input terminal of comparator 80 is connected to a terminal 82 for receiving a signal, $V_{th}$, representative of the desired airspeed error threshold level (i.e., the maximum permissible airspeed error which can occur before a wind shear correction signal is injected into the speed command channel 14). Thus, whenever the actual airspeed, $V_{cas}$, falls below the selected airspeed, $V_{sel}$, by more than the predetermined threshold, $V_{th}$, switching logic 46 is activated. As can be seen in FIG. 2, this causes the wind shear representative signal that is coupled to terminal 76 by the wind shear detector 52 to be supplied to summing unit 92 of speed command channel 14 via a signal limiter 84 and contacts S1-A of switching logic 46. In addition, this same signal is coupled to a signal processing unit 87 by means of contacts S1-B of switching logic 46.

Signal limiter 84 passes only those wind shear representative signals that are associated with a decrease in aircraft airspeed. For example, in an embodiment of FIG. 2 wherein the wind shear detector 52 supplies a positive signal when wind shear induces a decrease in true airspeed, signal limiter 84 is configured to pass only positive signals. Accordingly, it can be recognized that summing unit 92 of speed command channel 14 is supplied with a wind shear correction signal, $W_{sh}$, that is substantially equal to the wind shear representative signal, $W_s$, that is developed by wind shear detector 52 when and only when the aircraft calibrated airspeed ($V_{cas}$) is less than the selected airspeed ($V_{sel}$) and the difference between the selected and calibrated airspeeds is greater than the predetermined threshold level set by comparator 80 ($V_{th}$).

Signal processing unit 87 of the embodiment depicted in FIG. 2 does not contribute to the wind shear correction signal while the calibrated airspeed is less than the selected airspeed by more than the desired threshold level (i.e., while $V_{sel} - V_{cas} < V_{th}$), but is utilized to inject a monotonically decreasing signal into speed command channel 14 once the system has caused the aircraft to accelerate so that the airspeed is within the desired threshold level of the selected airspeed. More specifically, in the signal processing unit 87 of FIG. 2, the signal provided by signal limiter 84 is coupled to an integrator 88 via contacts S1-B whenever switching logic 46 is activated and establishes the initial condition of the integrator 88. A gain unit 90 or other device, such as a passive element, is connected between the input and output terminals of integrator 88 to establish the transfer function of the interconnected integrator 88 and gain unit 90 substantially equal to $1/(s+K_3)$, where $K_3$ is a gain constant associated with gain unit 90. As can be seen in FIG. 2, the output terminal of integrator 88 is connected to contact pair S1-A of switching logic 46 so that the output terminal of integrator 88 is coupled to summing unit 92 of speed command channel 14 whenever switching logic 46 is deactivated. Thus, it can be seen that the wind shear correction signal provided by the embodiment of FIG. 2 is given by the expression.

$W_{sh} = W_s$, for the time interval $t_0 \leq t \leq t_1$, where $t_0$ denotes the time at which calibrated airspeed ($V_{cas}$) falls below selected airspeed ($V_{sel}$) by an amount equal to or exceeding the preselected threshold ($V_{th}$) and $t_1$ denotes the time at which the aircraft airspeed is restored to within the threshold value of the selected airspeed; and $$W_{sh} = W_{t1} e^{-K_3 t},$$

where $W_{t1}$ denotes the initial condition of integrator 88 at time $t = t_1$.

Thus, in the arrangement of FIG. 2, the wind shear correction signal is substantially equal to the signal provided by wind shear detector 52 whenever the airspeed error is greater than the predetermined threshold value and actual airspeed is less than selected airspeed and exponentially decreases to zero following each time period in which wind shear correction is injected into the speed command channel 14.

It should be recognized that various signal processing techniques other than that depicted in FIG. 2 can be utilized. For example, satisfactory results can sometimes be attained by eliminating signal processing unit 87 and the associated contact pair S1-B of switching logic 46. In other embodiments of the invention that have provided satisfactory operation, the wind shear correction signal $W_{sh}$ is provided by an arrangement equivalent to signal processing unit 87 whenever the actual airspeed falls below the selected airspeed by an amount at least equal to the predetermined threshold value. Thus, in such an embodiment, the wind shear correction is $W_{sh} = W_{t0} e^{-K(t-t_0)}$, where K is a constant determined by various design parameters of the signal processing unit, t denotes time and $t_0$ denotes the time at which aircraft airspeed error exceeds the predetermined threshold value.

Those skilled in the art should also recognize that a variety of arrangements can be utilized to realize the above-described operation of integrator 88 and gain unit 90. For example, in an analog implementation of the embodiment of FIG. 2, conventional circuit arrangements employing an operational amplifier having a capacitive feedback network and provision for establishing the initial charge stored by the feedback capacitor can be utilized as the integrator 88. In such an arrangement, a second resistive feedback network can be utilized to realize the gain unit 90 and hence, establish the decay rate of the wind shear correction signal $W_{sh}$.

Regardless of the exact configuration of wind shear correction unit 12, it can be recognized from the foregoing description that a wind shear correction signal $W_{sh}$ is only provided in the embodiment of FIG. 2 when aircraft airspeed falls below the selected speed by a predetermined amount and at least a portion of that speed error is caused by wind shear. Thus, the arrangement of FIG. 2 produces a wind shear correction signal $W_{sh}$ only under conditions such as the execution of a landing approach into the wind while passing through a region of substantially wind shear. As previously mentioned, the inability of prior art systems to accurately maintain airspeed under such wind shear conditions and the substantial time that has previously been required to recover the airspeed lost in such a maneuver has presented one of the most significant limitations relative to the use of automatic throttle systems.

With continued reference to FIG. 2 and with specific reference to the depicted speed control channel 14, the signal representing selected airspeed ($V_{sel}$) is coupled to the second input port of summing unit 92 via a signal limiter 94. Signal limiter 94 establishes the operational range of the automatic throttle control system by eliminating all selected airspeed signals ($V_{sel}$) that are either greater than a level which corresponds to the maximum system airspeed allowed by the system or are less than a level that corresponds to the minimum allowable system airspeed. The output port of summing unit 92, which supplies a signal substantially equal to the sum of the selected airspeed and any wind shear correction signal that may be present (i.e., $V_{sel}+W_{sh}$), is coupled to the input port of a summing unit 96 having the output port thereof coupled to an integrator 98 via a signal limiter 100. The output terminal of integrator 98 is connected to the subtractive input port of summing unit 96 to provide rate-limited first-order filtering of the signal provided by summing unit 92 while simultaneously providing for the previously discussed signal $\dot{V}_{sel}$ which is supplied to the turbulence compensation channel 16 whenever a new value of selected airspeed is ($V_{sel}$) coupled to speed command channel 14. More specifically, the signal provided by integrator 98 and identified as speed command $V_{com}$ is coupled to a subtractive input port of a summing unit 102 and the input signal of integrator 98 (the output signal of limiter 100) is coupled to summing unit 74 of wind shear detector 42 via a gain unit 104 having a gain factor equal to $V_{tas}/V_{cas}$. With this arrangement it can be shown that, for all selected airspeeds within the range of signal limiter 100, $V_{com}=(V_{sel}+W_{sh})L_1(s)$ where $L_1(s)$ denotes the rate-limited first order filter function associated with the feedback network formed by limiter 100 and integrator 98. Further, it can be shown that $\dot{V}_{sel}=sV_{com}(V_{tas}/V_{cas})$. Thus, it can be recognized that $\dot{V}_{sel}$ is proportional to the time rate of change of $V_{com}$ (i.e., $dV_{com}/dt$) and, as previously stated, thus represents the time rate of change in selected airspeed (i.e., $dV_{sel}/dt$).

To complete speed command channel 12 and produce the $K_aV_e$ component of the throttle command signal, the rate-filtered speed command signal ($V_{com}$) is subtracted from the calibrated airspeed ($V_{cas}$) within summing unit 102 and the difference signal ($V_{cas}-V_{com}$) is coupled to one input port of summing unit 24 via cascade-connected gain units 106 and 108. As is indicated in FIG. 2, gain unit 108 exhibits a constant gain factor, $K_a$, and gain unit 106 exhibits a variable gain factor, $V_{tas}/V_{cas}$ to compensate for any difference between the calibrated airspeed and true airspeed of the aircraft (i.e., to normalize the signals supplied by summing unit 102 and signal limiter 100 relative to airspeed). As is known in the art, various conventional apparatus can be employed in implementing gain units 104 and 106 with the particular type employed depending primarily on the signal format being utilized. For example, analog multiplier circuits can be used in an analog realization of the embodiment of FIG. 2; well-known arrangements of multiplying type digital-to-analog converters can be employed in systems in which both analog and digital signals are utilized; and, a wide variety of digital signal processing devices can be used in digital implementations of the invention.

Both the structure and operation of the embodiment of FIG. 2 can be summarized by comparing the throttle command signal provided during operational periods in which aircraft airspeed does not fall below the selected airspeed by more than the previously mentioned airspeed error threshold value with the throttle command signal that is provided when airspeed diminishes below this level. First, in view of the foregoing discussion of the arrangement of FIG. 2, it can be recognized that switching logic 46 is deenergized and no wind shear correction signal ($W_{sh}$) is coupled into the speed command channel 12 as long as airspeed remains near or above the selected value, (i.e., as long as $V_{sel}-V_{cas} \leq V_{th}$, where $V_{th}$ is the signal applied to terminal 82 in FIG. 2 and represents the desired airspeed error threshold value). Under this condition it can be shown that the basic system control law $K_aV_e+K_b\dot{V}$ (which generically describes the various embodiments of the invention during periods in which wind shear correction is not required) is augmented by the previously mentioned term that represents the time rate of change in selected airspeed. More specifically, it can be shown that when no wind shear correction signal ($W_{sh}$) is being coupled into the speed command channel 14, the throttle command signal of the arrangement illustrated in FIG. 2 can be expressed as $$\delta_t = K_aV_e + K_b\dot{V} - K_b(V_{tas}/V_{cas})sV_{com} \qquad (1)$$

where, in terms of previously defined parameters of FIG. 2, $V_e - (V_{cas}-V_{com})(V_{tas}/V_{cas})$ (the filtered and normalized difference between selected and actual airspeed);

$V_{com} = V_{sel}L_1(s)$; and $\dot{V} = \dot{V}_i - W_s$

On the other hand, when aircraft airspeed falls below selected airspeed by the predetermined amount (i.e., $V_{sel}-V_{cas} \geq V_t$), a wind shear correction signal ($W_{sh}$) is injected into the speed command channel and the throttle command signal is $$\delta_t = K_a[V_e - L_1(s)W_{sh}] + K_b\dot{V} - K_b(V_{tas}/V_{cas})sV_{com}) \qquad (2)$$

where $\dot{V} = \dot{V}_i - sL_1(s)W_{sh}(V_{tas}/V_{cas}) - W_s$ with $W_{sh}$ being directly proportional to the amount of wind shear present when switching logic 46 is activated (e.g., being equal to the positive signal level ($W_s$) at the output of wind shear detector 52 as long as ($V_{sel} - V_{cas}$) equals or exceeds $V_{th}$ and being equal to $W_{t1}e^{-kt}$ during the time interval that follows each interval in which switching logic 46 is activated, where $W_{t1}$ denotes the value of $W_{sh}$ at the time switching logic 46 deactivates, k denotes a preselected constant and t denotes the amount of time following deactivation of switching logic 46.

During time periods in which actual airspeed is less than selected airspeed by an amount equal to or greater than the system airspeed error threshold value, the value of $W_{sh}$ for the arrangement of FIG. 2 is substantially identical to the value of $W_s$ (the signal supplied by wind shear detector 52). Thus, $\dot{V} = \dot{V}_i - W_{sh}[1 + sL(s)(-V_{tas}/V_{cas})]$. Comparing this expression with the expression for $\dot{V}$ relative to Equation (1), it can be recognized that the circuit path between signal limiter 100 and summing unit 74 that is defined by gain unit 104, in effect increases the gain of the turbulence compensation channel by a factor equal to $sL(s)V_{tas}/V_{cas}$ wherever a wind shear compensation signal is being supplied to speed command channel 14. This corrective signal component is in addition to the signal component $K_aL_1(s)W_{sh}$ of Equation (2), which is supplied through operation of the speed command channel 14. Further, since multiplication by the Laplacian operator, s, is equivalent to differentiation in the time domain, it can be recognized that the embodiment of FIG. 2 provides a correction signal dependant of both the present value of wind shear and the time rate-of-change in such wind shear.

Figure 3A:
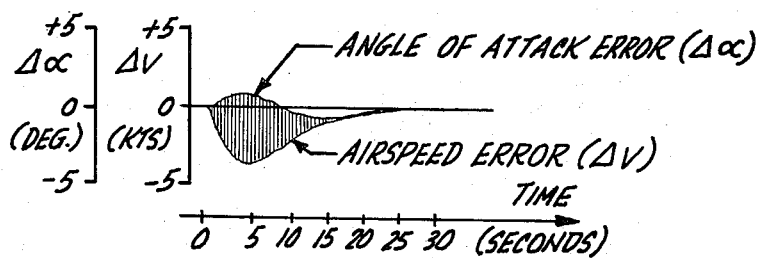
FIGS. 3a and 3b graphically depict the wind shear performance of an aircraft equipped with an automatic throttle control system not employing the wind shear correction techniques of this invention.
Figure 3B:
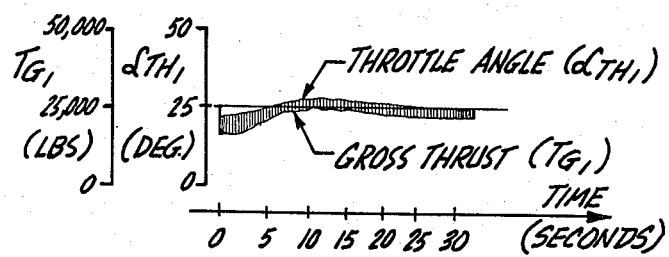
Figure 4A:
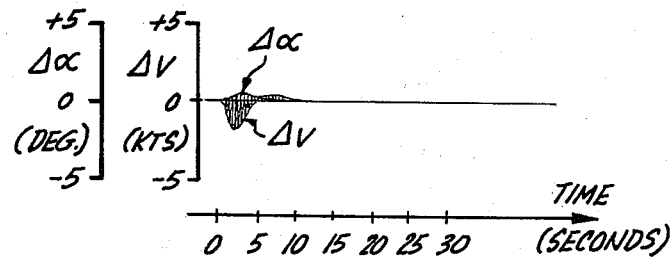
FIGS. 4a and 4b graphically depict the wind shear performance of an aircraft equipped with an embodiment of the invention, under test conditions substantially identical to those utilized in FIG. 3; and, FIGS. 5–7 are flow charts that illustrate a typical logical and computational sequence for a realization of the embodiment depicted in FIG. 2 that employs a computer or other programmed logic arrangement.

The improvement obtained through the practice of this invention is illustrated by FIGS. 3 and 4, which respectively depict wind shear performance of an aircraft equipped with an automatic throttle control system that utilizes the basic throttle control law of Equation (1), regardless of airspeed losses due to wind shear (i.e., a system without the wind shear correction signal) and the wind shear performance of an aircraft equipped with an automatic throttle control system having control law that corresponds to Equation (2) during periods of wind shear-induced losses in airspeed (i.e., a system utilizing the wind shear correction signal). More specifically, FIGS. 3 and 4 illustrate test data acquired during reducing the present invention to practice wherein a flight similator, which includes simulation of the airframe, propulsion system and both the mechanical and electronic portions of the flight control system of a particular aircraft and which is known to produce test results corresponding to those obtained under actual flight conditions, was adapted to employ the control laws expressed in Equations (1) and (2). As is illustrated in FIG. 3a, when the system was operated without the wind shear correction signal and was subjected to a wind shear of approximately $-8.5$ knots per 100 ft. altitude during a typical landing approach, airspeed error rapidly increased to a maximum value of approximately 4 knots (approximately 5 seconds after encountering the wind shear) and approximately 28 seconds was required for the system to restore airspeed to the selected value. As is also shown in FIG. 3a, the angle of attack error ($\Delta\alpha$) attained a maximum value of approximately one degree, which typically causes a decrease in flight path angle of approximately the same amount. As is clearly shown in FIG. 4a, utilization of a wind shear correction signal in accordance with the invention substantially improves system accuracy and response time relative to both airspeed error and response time. In particular, the airspeed error in FIG. 4a reaches a maximum value of approximately 2 knots and a period of only four seconds is required for the system to restore airspeed to the selected value. Additionally, as is indicated in FIG. 4a, the error in the angle of attack is also decreased over that of FIG. 3a in that a maximum increase of approximately 0.5 degrees is exhibited.

Figure 4B:
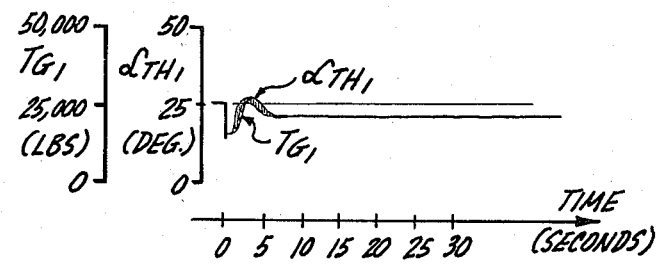

As is illustrated by FIGS. 3b and 4b less throttle activity is generally experienced with a system employing the wind shear correction signal of the invention than is experienced in prior art systems. In particular, as can be seen in FIG. 3b, both throttle angle ($\delta_{th}$) and the gross thrust supplied by the aircraft propulsion system ($T_G$) increase slowly in the system not employing the wind shear correction signal, reaching a maximum value approximately 10 seconds after the wind shear encounter and gradually decreasing to the value required to maintain airspeed under the wind shear conditions. In comparison and as is shown in FIG. 4b, when the wind shear correction signal is utilized both throttle angle and gross thrust are rapidly changed so as to reach the values necessary to restore the aircraft to the selected airspeed within the four-second response time exhibited under the depicted test conditions.

As is known to those skilled in the art, automatic throttle control systems can be embodied in various manners, including realizations which consist entirely of conventional circuits and realizations which employ programmable computational devices. With respect to the latter type of system, various arrangements are known, including those which utilize silicon integrated circuits known as microprocessors that use "firm-ware" programming established by read only memory (ROM) circuits which are interconnected with an integrated circuit that comprises a central processing unit (CPU) and realizations which are based on essentially "general-purpose" computers that are programmed through conventional software techniques. For example, the large jet-propelled transport aircraft presently in service and those being proposed often incorporate a computer-based electronic flight control system which includes one or more programmable computers configured to perform the automatic throttle control function as well as numerous other flight control and flight monitoring functions.

One marked advantage of the present invention is that it can be incorporated in the more modern computer-based flight control systems as well as being realizable through the use of more conventional, specific logic circuit designs. In this regard, the invention is presently included in a flight control system having potential use on a proposed short take-off and landing (STOL) aircraft that utilizes a computer-based, triply redundant digital flight control system similar to the system discussed in AIAA Paper No. 75-1087, entitled "YC-14 Digital Control Data Management", by Richard E. Kestek and AIAA Paper No. 75-1027, entitled "YC-14 Flight Control", by Allan H. Lee.

Those skilled in the area of digital processing within the flight control arts will recognize that the detailed organization of either firm-ware or software of an embodiment of the invention which utilizes a programmed computational unit depends on a number of factors such as the type of computational unit being employed and whether or not the computational unit is shared with other avionics or flight control systems. In this respect and regardless of the exact computational device employed, the operational sequence utilized in the practice of the invention is apparent from the previously-discussed structure and operation of the embodiments of FIGS. 1 and 2 and is further illustrated with reference to the flow charts depicted in FIGS. 5 through 7.

Figure 5:
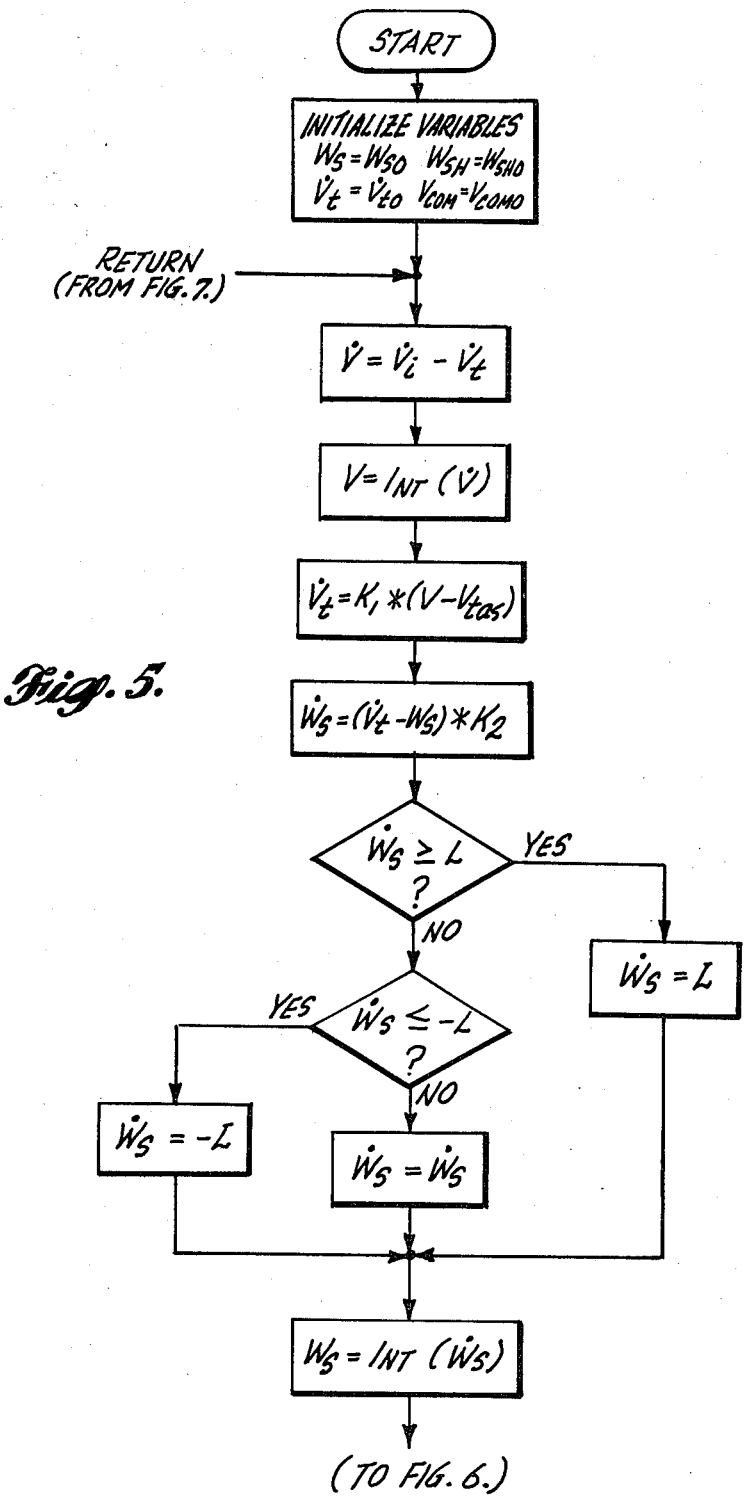

Referring now to FIG. 5, which sets forth an operational sequence or logic diagram useful in implementing a computational sequence equivalent to the operation of wind shear detector 52 of FIG. 2, the system variables $W_s$ and $W_{sh}$ previously referred to and identified with respect to the embodiment of FIG. 2 are initialized at values which will cause the computational sequence to yield accurate results with a minimum number of iterations each time the throttle control system is activated. $\dot{V}_t$ and $V_{com}$, which represent intermediate parameter values that are utilized during the hereinafter-described operational sequence, are also initialized in the same manner. Following such initialization, the value of a parameter identified as $\dot{V}$ is set equal to $\dot{V}_i - \dot{V}_t$, which corresponds to the instantaneous value of the signal supplied by summing unit 54 of the arrangement of FIG. 2. The variable $\dot{V}$ is then integrated through the use of one of a number of conventional computer-implemented techniques to provide a parameter value denoted as V in FIG. 5. Next, the current value of true airspeed, $V_{tas}$ is subtracted from the calculated value of V and the difference is multiplied by the gain constant $K_1$ to obtain the value of $\dot{V}t$. An intermediate computational parameter $\dot{W}_s$, which corresponds to an instantaneous value of the signal provided by gain unit 66 of the arrangement depicted in FIG. 2, is then determined by multiplying the difference between $V_t$ and $W_s$ by the gain constant $K_2$.

Operation corresponding to that of signal limiter 68 of the embodiment of wind shear detector 52 that is depicted in FIG. 2 is then effected by determining whether the current value of $\dot{W}_s$ is greater than $+L$; less than $-L$; or lies therebetween, where L is a preselected scaler value. In this regard, if $\dot{W}_s$ is more negative than the lower limit $(-L)$ or more positive than the upper limit $(+L)$, its value is set equal to the corresponding limit of $-L$ and $+L$. If the current value is within the range $(-L, +L)$, the value of $\dot{W}_s$ is not altered by the operational sequence of FIG. 5. The previously-discussed wind shear representative signal $W_s$ is then determined by integrating $\dot{W}_s$ to thereby provide an operational sequence that fully corresponds to the previously-discussed operation of the wind shear detector 52 of FIG. 2. As will be understood in the art, the operational sequence is repeated at an iteration rate which provides satisfactory operation. For example, because of the response time of the system, satisfactory results often can be achieved at rates on the order of 25 iterations per second. Thus, real-time computation is easily attained. Further, since the system is amenable to relatively low iteration rates and does not require substantial computational capability, both the operational sequence of FIG. 5 and the hereinafter-described operational sequences of FIGS. 6 and 7 can be implemented within a computer-based system which performs flight control functions in addition to automatic throttle control.

Figure 6:
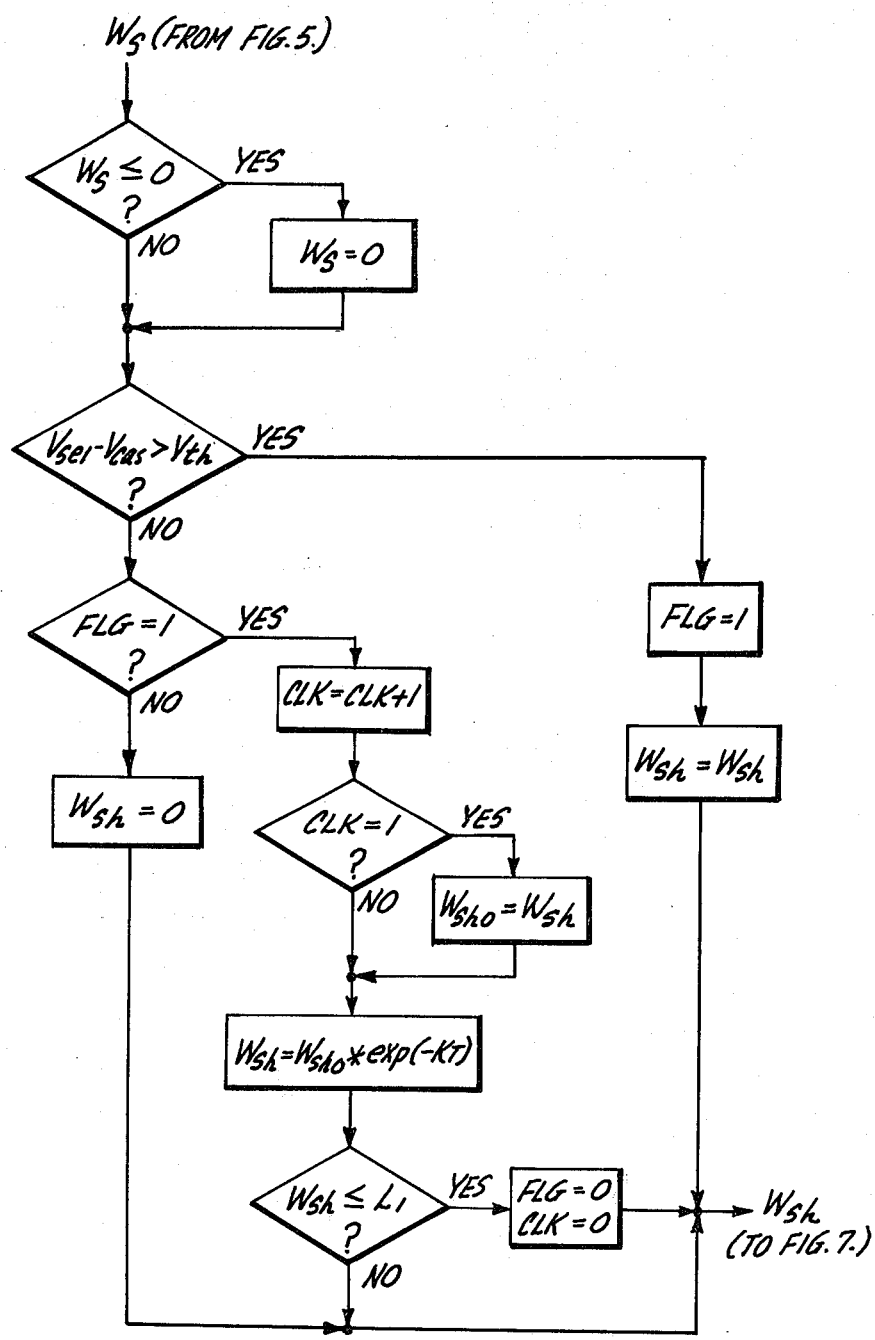

FIG. 6 depicts one example of a computational sequence that corresponds to the previously-discussed operation of wind shear correction unit 12 of FIG. 2. More specifically, in the logic sequence of FIG. 6, operation corresponding to that of signal limiter 84 in FIG. 2 is achieved by setting the wind shear representative signal $W_s=0$ if $W_s$ is less than or equal to zero and by not altering positive values of $W_s$. Airspeed error is then determined in a manner equivalent to that accomplished by airspeed error detector 44 by subtracting the current value of calibrated airspeed ($V_{cas}$) from the current value of the selected airspeed ($V_{sel}$) and comparing the obtained difference with the desired maximum allowable error ($V_{th}$).

If the aircraft airspeed is below the selected airspeed by an amount equal to or greater than the maximum threshold value, the wind shear correction signal $W_{sh}$ is set equal to the previously-determined value of the wind shear representative signal $W_s$ and a flag or indicator (denoted as FLG in FIG. 6) is set equal to a logical 1.

The flag signal, FLG, is utilized to provide an indication of the status of the wind shear correction signal during the nextmost iteration of a computational device employing the operational sequence of FIG. 6 so that the system can implement the previously-discussed exponential decay of the wind shear correction signal each time the system restores aircraft airspeed to within $V_{th}$ of $V_{sel}$ in a manner equivalent to the previously described operation of switching logic 46 and signal processing unit 87. More specifically, in the arrangement of FIG. 6, as long as aircraft airspeed is below selected airspeed by an amount equal to or exceeding the system threshold ($V_{th}$), the flag signal, FLG, remains equal to a logical 1 and the wind shear correction signal, $W_{sh}$, remains equal to the wind shear representative signal, $W_s$. On the other hand, whenever $V_{sel} - V_{cas}$ is less than $V_{th}$, the sequence depicted in FIG. 6 tests the value of FLG and, when FLG=1, utilizes a series of computational steps which cause $W_{sh}$ to decay in the desired manner. In particular, the arrangement of FIG. 6 utilizes a clock or count variable CLK that is incremented by one during each iteration in which $V_{sel} - V_{cas}$ is less than $V_{th}$ and FLG is equal to 1. Since, as shall be described, CLK is set equal to zero when the desired exponential decay is initially implemented, the arrangement of FIG. 6 establishes a computational variable $V_{sh0}$ equal to the current value of the wind shear $W_{sh}$ during the first system iteration after airspeed has been restored to an acceptable value (i.e., CLK=1). During this iteration and each subsequent iteration until the exponential decay is complete, the wind shear correction signal $W_{sh}$ is set equal to $W_{sh0}$ multiplied by $e^{-KT}$, where e is the base of the system of natural logarithms, K is a constant and T represents elapsed time (e.g., the clock variable CLK or a quantity dependant thereon can be utilized for T). After establishing the current value of the exponentially decaying portion of the wind shear correction signal $W_{sh}$, the operational sequence of FIG. 6 next determines whether the wind shear correction signal has decayed to substantially zero (i.e., determines whether to terminate the wind shear correction signal). As is indicated in FIG. 6, this can be implemented by determining whether $W_{sh}$ is less than $L_1$, where $L_1$ is a positive number that is slightly greater than zero. If the wind shear correction signal has not reached the lower limit $L_1$, the current value of $W_{sh}$ is utilized in the logic sequence of FIG. 7, which implements an operational sequence equivalent to the operation of the previously-described speed command channel 14 of FIG. 2. If $W_{sh}$ is less than $L_1$, the desired exponential decay of the wind shear correction signal $W_{sh}$ is complete. In this case, the clock variable CLK and the flag signal FLG are set equal to zero before the operational sequence depicted in FIG. 7 is initiated.

Additionally, it can be noted that the operational sequence depicted in FIG. 6 causes the wind shear correction signal to be set equal to zero during each iteration in which the airspeed error is within the allowable range (i.e., calibrated airspeed is not below selected airspeed by more than the system threshold, $V_{th}$) and the system is not operating to exponentially decrease the wind shear correction signal. More specifically, if it is determined that $V_{sel} - V_{cas} \geq V_{th}$ and FLG is not equal to 1 (i.e., FLG=0), the wind shear correction signal $W_{sh}$ is set equal to zero prior to initiating sequence of FIG. 7.

Figure 7:
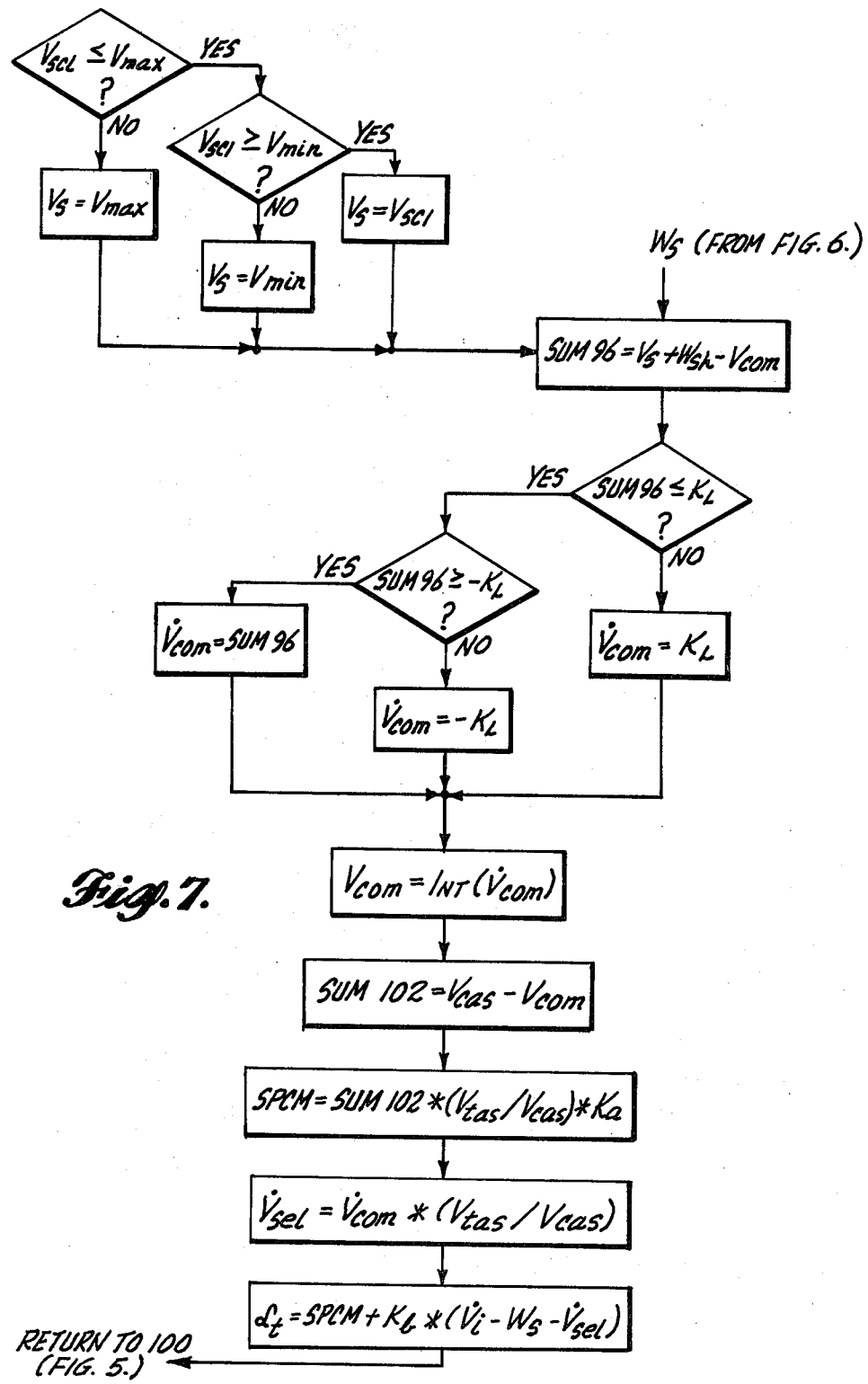

Referring now to FIG. 7, operation of a computational unit that is equivalent to the operation of signal limiter 94 of the speed command channel 14 of FIG. 2 can be implemented, for example, by determining whether $V_{sel}$ (the selected airspeed signal) is less than the minimum allowable value (denoted $V_{min}$ in FIG. 7) or is greater than the maximum allowable airspeed ($V_{max}$). Whenever the selected airspeed is outside of the acceptable system range ($V_{min}$, $V_{max}$), the current value of a computational variable $V_s$ is set equal to the corresponding system limit ($V_{min}$ or $V_{max}$). If the selected airspeed is within the system range, the variable $V_s$ is set equal to the current value of $V_{sel}$. Next, operation equivalent to that effected by summing units 92 and 96 of FIG. 2 is accomplished by establishing the current value of a system variable SUM 96, equal to the current value of $V_s + W_{sh} - V_{com}$. As shall be described hereinafter, $V_{com}$ is calculated so that it corresponds to the output signal provided by the integrator 98 of FIG. 2.

Operation equivalent to that achieved by signal limiter 100 of FIG. 2 is then effected in the logic sequence of FIG. 7 by comparing the value of the variable SUM 96 with desired upper and lower limits (denoted as $K_L$ and $-K_L$). As long as the value of SUM 96 is between $-K_L$ and $K_L$, the current value of a system parameter denoted as $\dot{V}_{com}$ is set equal to the current value of SUM 96. If the value of SUM 96 is either less than the lower limit ($-K_1$) or greater than the upper limit ($+K_L$), $\dot{V}_{com}$ is set equal to the corresponding limit, $-V_L$ or $+V_L$. An updated value of the previously-mentioned system variable $\dot{V}_{com}$ is then determined through integration of $V_{com}$, which can be effected through numerous well-known computational techniques.

Operation which correponds to that accomplished by summing unit 102 of FIG. 2 is then effected by establishing the value of a system parameter SUM 102 equal to the present value of $V_{cas} - V_{com}$. The current value of a system parameter identified as SPCM which corresponds to the output signal provided by speed command channel 14 of FIG. 2 is then determined by multiplying SUM 102 by $K_a$ and by the normalizing factor $V_{tas}/V_{cas}$.

To complete the exemplary sequence of FIG. 7 and provide a current value of a throttle control signal the current value of a signal, $\dot{V}_{sel}$, which corresponds to the signal provided by gain unit 104 of FIG. 2, is determined by multiplying the current value of $\dot{V}_{com}$ by the normalizing factor, $V_{tas}/V_{cas}$. The throttle control signal $\delta_t$ is then set equal to the sum of SPCM and the product of $K_b$ multiplied by the quantity $\dot{V}_i - W_s - \dot{V}_{sel}$. As previously mentioned, this value of throttle control signal is utilized until a change in value is obtained during a subsequent iteration.

Those of ordinary skill in the art will recognize that the embodiments of the invention depicted and described herein are exemplary in nature. For example, and as previously mentioned, various modifications can be made in the signal processing that is performed on the wind shear representative signal to thereby ensure both rapid and smoothly varying alterations of aircraft speed.

The embodiments of the invention in which an exclusive property or privilege is claimed are defined as follows:

1. In an automatic control system of the type including a throttle controller that supplies a throttle control signal substantially reprsented by the expression $K_a V_e + K_b V$, where $K_a$ and $K_b$ are system gain factors, $V_e$ is representative of the difference between the present airspeed of an aircraft utilizing said automatic control system and a selected airspeed, and V is representative of the longitudinal inertial acceleration of said aircraft, the improvement comprising:

wind shear correction means for supplying a compensation signal to supplement said throttle control signal during periods of time in which the difference between said present airspeed and said selected airspeed of said aircraft is at least partially due to atmospheric wind shear, said compensation signal being of the form $W_s F(s)$, where $W_s$ is representative of the wind shear encountered by said aircraft and F(s) denotes a frequencey dependent transfer function, said wind shear correction means including signal processing means responsive to a signal representative of said present airspeed of said aircraft and responsive to a signal representative of said longitudinal inertial acceleration of said aircraft for supplying said compensation signal to said throttle controller, said signal processing means including wind shear detection means, said wind shear detection means including means for deriving a signal which theoretically represents the acceleration of said aircraft from said signal representative of said present airspeed, means for determining the difference between said signal theoretically representative of said acceleration and said signal representative of said longitudinal inertial acceleration of said aircraft, means for filtering said difference signal to remove at least a portion of those signal components representative of atmospheric turbulence other than wind shear and means for coupling said filtered difference signal to said throttle controller as said compensation signal, said means for coupling said filtered difference signal to said throttle controller including means for determining that the difference between said present airspeed and said selected airspeed exceeds a predetermined value and means for supplying said filtered difference signal to said throttle controller only when said difference between said present airspeed and said selected airspeed exceeds said predetermined value, said means for coupling said filtered difference signal to said throttle controller further including means for combining said filtered difference signal with said throttle control signal to provide a signal of the form $K_a V_e + K_b V$ when said difference between said present airspeed and said selected airspeed is less than said predetermined value and to provide a signal of the form $K_a V_e + K_b V + W_s F(s)$ when said difference between said present airspeed and said selected airspeed exceeds said predetermined value.

2. The throttle control system of claim 1 wherein said throttle controller includes first and second signal paths for respectively supplying said components $K_aV_e$ and $K_bV$ and wherein said compensation signal is injected into said first signal path.

3. The automatic control system of claim 2 wherein said system further comprises an additional signal path, said additional signal path including means for interconnecting said first and second signal paths to couple a signal representative of the time rate of change in wind shear encountered by said aircraft into said second signal path for modifying the signal component provided by said second signal path when said aircraft encounters atmospheric wind shear.

4. The automatic throttle control system of claims 1, 2, or 3 wherein said improvement further comprises switching logic for supplying said compensation signal only during periods of time in which said selected airspeed of said aircraft is greater than said present airspeed of said aircraft.

5. The automatic throttle control system of claim 4 wherein said improvement further comprises signal conditioning means responsive to the difference between said selected airspeed and said present airspeed of said aircraft, said signal conditioning means including means for monotonically decreasing said compensation signal as a predetermined function of time whenever said automatic throttle control system operates to decrease the difference between said selected airspeed and said present airspeed to a predetermined value.

6. Control apparatus for regulating the propulsion system of an aircraft in response to an applied selected airspeed signal representative of the desired aircraft speed, an applied current airspeed signal representative of the present airspeed of said aircraft and an applied inertial acceleration signal representative of inertial acceleration along the aircraft flight path; said control apparatus comprising:

a speed command channel responsive to said applied selected airspeed signal and said applied current airspeed signal, said speed command channel including first signal processing means for processing said applied selected airspeed signal and said applied current airspeed signal to generate an airspeed error signal representative of the difference between said desired airspeed and said present airspeed of said aircraft, said speed command channel further including second signal processing means connected for receiving said airspeed error signal, said second signal processing means generating a first component of a control signal for regulating said aircraft propulsion system;

a turbulence compensation channel for supplying a second signal component of said control signal for regulating said aircraft propulsion system, said turbulence compensation channel including third signal processing means responsive to said applied current airspeed signal and said applied inertial acceleration signal for generating an airspeed disturbance signal representative of variations in the airspeed of said aircraft that are induced by atmospheric conditions, said turbulence compensation channel further comprising fourth signal processing means connected for receiving said airspeed disturbance signal, said fourth signal processing means generating said second signal component of said control signal, said fourth signal processing means including means responsive to said airspeed disturbance signal for supplying a signal representative of the wind shear being encountered by said aircraft;

means for combining said first signal component supplied by said speed command channel and said second signal component supplied by said turbulence compensation channel to supply said control signal for regulating said aircraft propulsion system; and wind shear correction means responsive to said signal representative of the wind shear being encountered by said aircraft for supplying a compensation signal to said speed command channel, said wind shear correction means including switching means responsive to said applied current airspeed signal and said applied selected airspeed signal, said switching means including means for supplying said compensation signal to said speed command channel during periods of time in which the difference between said desired airspeed and said present airspeed exceeds a first predetermined value.

7. The control apparatus of claim 6 wherein said wind shear correction means further includes signal conditioning means for continuing to provide said compensation signal for a period of time following each said period of time in which said difference between said desired airspeed and said present airspeed exceeds said first predetermined value, said signal conditioning means including means for monotonically decreasing said compensation signal as a function of time from an initial value substantially equal to the value of said compensation signal when said control apparatus decreases said difference between said desired airspeed and said present airspeed to a value substantially equal to said first predetermined value.

8. The control apparatus of claim 7 wherein said first signal processing means of said speed command channel includes means for filtering said applied selected airspeed signal to supply an airspeed command signal and means for combining said airspeed command signal with said signal representative of said applied airspeed to supply said airspeed error signal;

said speed command channel further comprising means for summing said compensation signal supplied by said wind shear correction means with said applied selected airspeed signal prior to application of said applied airspeed signal to said filtering means.

9. The control apparatus of claim 8 wherein said third signal processing means of said turbulence compensation channel exhibits a transfer characteristic substantially corresponding to $K_1(V_i-sV_{tas})/(s+K_1)$, where s is the Laplacian operator, $K_1$ is a preselected real number, $V_i$ represents said applied inertial acceleration signal and $V_{tas}$ represents said current airspeed signal.

10. The control apparatus of claim 9 wherein said fourth signal processing means of said turbulence compensation channel comprises a rate-limited, first order signal filtering means and wherein said turbulence compensation channel further includes means for subtracting the signal supplied by said rate-limited, first order signal filtering means from said inertial acceleration signal to provide said second signal component of said control signal for regulating said aircraft propulsion system.

11. The control apparatus of claims 6, 7 or 10 wherein said wind shear correction means further includes means for controlling said switching means to supply said compensation signal to said speed command channel only during periods of time in which said desired airspeed exceeds said present airspeed by said first predetermined value.

12. The control apparatus of claim 11 wherein said first signal processing means of said speed command channel includes rate-limited first order signal filtering means for supplying an airspeed command signal and means for combining said airspeed command signal with said signal representative of said applied current airspeed to supply said airspeed error signal; and wherein said control apparatus further comprises a signal path for coupling a portion of the signal flowing through said speed command channel to said turbulence compensation channel, said signal path interconnecting said rate-limited, first order filtering means of said speed command channel and said fourth signal processing means of said turbulence compensation channel, said rate-limited, first order signal filtering means of said speed command channel and said signal path being collectively arranged to provide a signal representative of the time rate of change in said airspeed command signal when said difference between said desired airspeed and said present airspeed does not exceed said first predetermined value and to supply an additional signal component representative of said wind shear being encountered by said aircraft when said difference between said desired airspeed and said present airspeed exceeds said first predetermined value.

13. A method for automatically controlling the throttles of an aircraft comprising the steps of ongoingly:
 (a) detecting the current airspeed of said aircraft;
 (b) comparing the current airspeed of said aircraft with a selected airspeed to determine the current airspeed error of said aircraft;
 (c) forming a first throttle command signal component $K_a V_e$, where $K_a$ is a predetermined gain factor and $V_e$ is representative of said current airspeed error;
 (d) determining the time rate of change in the airspeed of said aircraft;
 (e) detecting the inertial acceleration of said aircraft along the flight path thereof;
 (f) determining the difference between said inertial acceleration of said aircraft and said time rate of change in said airspeed;
 (g) forming a second throttle command signal component from said difference between said inertial acceleration of said aircraft and said time rate of change in said airspeed, said second throttle command signal component being expressible as $K_b \dot{V}$, where $K_b$ is a gain factor and $\dot{V}$ is derived from said difference between said inertial acceleration and said time rate of change in said airspeed;
 (h) combining said first and second throttle command signal components to provide a signal representable as $K_a V_e + K_b \dot{V}$ for automatically operating said throttles of said aircraft;
 (i) determining the current magnitude of any atmospheric wind shear being encountered by said aircraft;
 (j) comparing said current airspeed error to a predetermined value to detect times at which said airspeed error exceeds said predetermined value; and
 (k) modifying at least one of said first and second throttle command signal components as a function of said current magnitude of said wind shear when said current airspeed error exceeds said predetermined value.

14. The method of claim 13 wherein said step of modifying at least one of said first and second throttle command components includes the step of increasing the magnitude of said first throttle command signal component by a factor substantially expressible as $K_c L_1(s) W_{sh}$, where $K_c$ is a predetermined real number, s is the Laplacian operator, $W_{sh}$ represents said current magnitude of the wind shear being encountered by said aircraft and $L_1(s)$ represents a rate-limited, first order filter function.

15. The method of claim 14 wherein said step of modifying at least one of said first and second throttle command signal components includes the substeps of determining the time rate of change in said atmospheric wind shear being encountered by said aircraft and decreasing said second throttle control signal component by a factor proportional to said time rate of change in said atmospheric wind shear.

16. The method of claim 15 wherein said second throttle command signal component is decreased by an amount substantially represented by the expression $K_d s L_1(s) W_{sh}$, where $K_d$ is a predetermined gain factor, $L_1(s)$ represents said rate-limited, first order filter function and $W_{sh}$ represents said atmospheric wind shear being encountered by said aircraft.

17. The method of claim 14 or 16 wherein said quantity representing said wind shear being encountered by said aircraft, $W_{sh}$, is substantially represented by the expression $K_e L_2(s)(\dot{V}_i - s V_{tas})/(s + K_1)$ where $V_i$ is representative of said inertial acceleration of said aircraft, $K_e$ is a predetermined gain factor, $K_1$ is a predetermined real number and $L_2(s)$ represents a rate-limited, first order filter function.

18. The method of claim 17 further comprising the step of further modifying at least one of said first and second throttle command signal components for a period of time following each time interval in which said current airspeed error exceeds said predetermined value, said step of further modifying at least one of said first and second throttle command signal components including the substeps of:
 (a) determining the value of said wind shear representative signal at the time when said current airspeed error decreases to said predetermined value; and
 (b) monotonically decreasing said modification signal $W_{sh}$ for a period of time following said time at which said current airspeed error decreases to said predetermined value.

19. The method of claim 18 wherein said substep of monotonically decreasing said modification signal comprises exponentially decreasing said modification signal.

20. The method of claim 19 wherein said step of modifying at least one of said first and second throttle control signal components is implemented for current airspeed errors wherein said selected airspeed exceeds said current airspeed of said aircraft.

* * * * *

UNITED STATES PATENT AND TRADEMARK OFFICE
CERTIFICATE OF CORRECTION

PATENT NO. : 4,422,147

DATED : December 20, 1983

INVENTOR(S) : Charles R. Hanke

It is certified that error appears in the above-identified patent and that said Letters Patent is hereby corrected as shown below:

| | | |
|---|---|---|
| Column 1, | line 16: | "well-known" should be --well known-- |
| | line 52: | "exhibit" should be --exhibits-- |
| Column 2, | line 12: | "short term" should be --short-term-- |
| | lines 27 & 28: | "atmospherically-induced" should be --atmospherically induced-- |
| | line 37: | "atmospherically-induced" should be --atmospherically induced-- |
| Column 3, | lines 35 & 36: | "atmospherically-induced" should be --atmospherically induced-- |
| Column 4, | line 22: | "arrangments" should be --arrangements-- |
| | line 37: | "above mentioned" should be --above-mentioned-- |
| Column 5, | line 66: | "previously-mentioned" should be --previously mentioned-- |
| Column 6, | line 43: | "reduce" should be --reduces-- |
| | lines 67 & 68: | "low pass" should be --low-pass-- |
| Column 8, | line 35: | "diagramatically" should be --diagrammatically-- |
| Column 9, | line 2: | "illustrate" should be --illustrated-- |
| | line 38: | "diagramatically" should be --diagrammatically-- |
| Column 10, | lines 23 & 24: | "subtractor" should be --subtracter-- |
| | line 39: | "subtractor" should be --subtracter-- |
| | line 42: | "atmospherically-induced" should be --atmospherically induced-- |
| | line 61: | "high pass" should be --high-pass-- |
| | line 65: | "low pass" should be --low-pass-- |
| Column 11, | line 11: | Insert --)-- (bracket) after "$F_3(s)$" |
| | line 12: | "high pass" should be --high-pass-- |
| | line 18: | "low pass" should be --low-pass-- |
| Column 12, | line 8: | "diagramatically" should be --diagrammatically-- |
| Column 13, | line 42: | Insert --,-- (comma) after "aircraft" |

UNITED STATES PATENT AND TRADEMARK OFFICE
CERTIFICATE OF CORRECTION

PATENT NO. : 4,422,147  Page 2 of 3
DATED : December 20, 1983
INVENTOR(S) : Charles R. Hanke It is certified that error appears in the above-identified patent and that said Letters Patent is hereby corrected as shown below:

| | | |
|---|---|---|
| Column 14, | line 54: | Insert --,-- (comma) after "$K_b \dot{V}$" |
| Column 15, | line 10: | Delete --in-- (1st occurrence) |
| | line 30: | Insert --,-- (comma) after "$V_{cas}$" |
| Column 16, | line 24: | Delete --.-- (period) after "expression" |
| Column 17, | line 3: | Insert --,-- (comma) after "and" |
| | line 15: | "substantially" should be --substantial-- |
| | lines 54 & 55: | Insert --,-- (comma) after "rate-limited" |
| Column 18, | line 34: | "$K_a V_e + K_b V$" should be --$K_a V_e + K_b \dot{V}$-- |
| Column 19, | line 2: | Insert --)-- (bracket) after "$(W_s)$" |
| | line 20: | Insert --,-- (comma) after "effect" |
| | line 30: | "dependant" should be --dependent-- |
| Column 21, | lines 2 & 3: | "previously-discussed" should be --previously discussed-- |
| | line 26: | Insert --,-- (comma) after "$V_{tas}$" |
| | line 32: | "$V_t$" should be --$\dot{V}_t$-- |
| | lines 44 & 45: | "previously-discussed" should be --previously discussed-- |
| | line 47 & 48: | "previously-discussed" should be --previously discussed-- |
| | line 63: | "previously-discussed" should be --previously discussed-- |
| Column 22, | line 11: | "previously-determined" should be --previously determined-- |
| | line 19: | "previously-discussed" should be --previously discussed-- |
| | line 49: | "dependant" should be --dependent-- |
| | line 63: | "previously-described" should be --previously described-- |
| Column 23, | line 42: | "previously-mentioned" should be --previously mentioned-- |

UNITED STATES PATENT AND TRADEMARK OFFICE
CERTIFICATE OF CORRECTION

PATENT NO. : 4,422,147
DATED : December 20, 1983
INVENTOR(S) : Charles R. Hanke

It is certified that error appears in the above-identified patent and that said Letters Patent is hereby corrected as shown below:

| | | |
|---|---|---|
| Column 24, | line 11: | "reprsented" should be --represented-- |
| | line 60: | "$K_a V_e + K_b V$" should be --$K_a V_e + K_b \dot{V}$-- |
| | line 64: | "$V_e + K_b V + W_s F(s)$" should be --$V_e + K_b \dot{V} + W_s F(s)$-- |
| Column 25, | line 2: | "$K_b V$" should be --$K_b \dot{V}$-- |
| | line 32: | "speed" should be --airspeed-- |
| Column 26, | line 40: | Insert --current-- after "applied" |
| | line 46: | Insert --selected-- after "applied" |
| | line 54: | Insert --applied-- after "said" |
| Column 28, | line 36: | "$V_i$" should be --$\dot{V}_i$-- |

Signed and Sealed this

Twenty-third Day of April 1985

[SEAL]

Attest:

DONALD J. QUIGG

Attesting Officer     Acting Commissioner of Patents and Trademarks